US010458302B2

(12) United States Patent
Devito et al.

(10) Patent No.: US 10,458,302 B2
(45) Date of Patent: Oct. 29, 2019

(54) EXHAUST AFTERTREATMENT SYSTEM WITH AMMONIA GAS GENERATOR

(71) Applicants: Tenneco Automotive Operating Company Inc., Lake Forest, IL (US); Tenneco GmbH, Edenkoben (DE)

(72) Inventors: Mark Devito, Jackson, MI (US); Ryan A. Floyd, Mason, MI (US); Adam J. Kotrba, Laingsburg, MI (US); Padmanabha R. Ettireddy, Canton, MI (US); Michael C. Bradford, Chelsea, MI (US); Bradley Fingland, Jackson, MI (US); John W. Degeorge, Michigan Center, MI (US); Philipp Kreutziger, Landau (DE); Manuel Kluck, Neustadt (DE); Michael Flockert, Hassloch (DE); Mathias Hund, Hassloch (DE); Eric A. Hein, Neustadt an der Weinstrasse (DE)

(73) Assignees: Tenneco Automotive Operating Company Inc., Lake Forest, IL (US); Tenneco GmbH, Edenkoben (DE)

( * ) Notice: Subject to any disclaimer, the term of this patent is extended or adjusted under 35 U.S.C. 154(b) by 0 days.

(21) Appl. No.: 15/753,494

(22) PCT Filed: Aug. 19, 2016

(86) PCT No.: PCT/US2016/047700
§ 371 (c)(1),
(2) Date: Feb. 19, 2018

(87) PCT Pub. No.: WO2017/031396
PCT Pub. Date: Feb. 23, 2017

(65) Prior Publication Data
US 2018/0238217 A1 Aug. 23, 2018

Related U.S. Application Data

(63) Continuation-in-part of application No. 14/931,039, filed on Nov. 3, 2015, now Pat. No. 9,702,291.

(30) Foreign Application Priority Data

Aug. 20, 2015 (DE) .................. 10 2015 113 835

(51) Int. Cl.
*F01N 3/20* (2006.01)
*B01D 53/94* (2006.01)
*F01N 3/021* (2006.01)
*F01N 13/00* (2010.01)

(52) U.S. Cl.
CPC ......... *F01N 3/208* (2013.01); *B01D 53/9409* (2013.01); *B01D 53/9418* (2013.01); *B01D 53/9431* (2013.01); *B01D 53/9477* (2013.01); *B01D 53/9495* (2013.01); *F01N 3/021* (2013.01); *F01N 13/009* (2014.06); *B01D 2251/2062* (2013.01); *F01N 2240/25* (2013.01); *F01N 2610/02* (2013.01); *F01N 2610/06* (2013.01); *F01N 2610/08* (2013.01); *F01N 2610/10* (2013.01); *F01N 2610/14* (2013.01); *F01N 2610/1406* (2013.01); *Y02T 10/24* (2013.01)

(58) Field of Classification Search
CPC .. F01N 2610/03; F01N 2610/02; F01N 3/208; F01N 3/206; F01N 3/2066; F01N 3/103; F01N 3/101; F01N 3/035; B01D 53/9445; B01D 53/944; B01D 53/9418; B67D 7/00; B67D 7/02; B05B 7/00; B05B 7/24; B05B 7/26; B05B 7/262
See application file for complete search history.

(56) References Cited

U.S. PATENT DOCUMENTS

| | | | |
|---|---|---|---|
| 5,272,871 | A | 12/1993 | Oshima et al. |
| 5,809,775 | A | 9/1998 | Tarabulski et al. |
| 7,157,166 | B2 | 1/2007 | Vajo |
| 7,204,081 | B2 | 4/2007 | Yasui et al. |
| 7,418,957 | B2 | 9/2008 | Abe |

(Continued)

FOREIGN PATENT DOCUMENTS

| | | |
|---|---|---|
| DE | 4221363 A1 | 1/1993 |
| DE | 19947198 A1 | 4/2001 |

(Continued)

OTHER PUBLICATIONS

C.W. Park et al. "Effect of hydrogen-enriched gas as a reductant on the performance of a lean NOx trap catalyst for a light-duty diesel engine"; May 28, 2010.

*Primary Examiner* — Timothy C Vanoy
(74) *Attorney, Agent, or Firm* — Harness, Dickey & Pierce, P.L.C.

(57) ABSTRACT

An exhaust aftertreatment system may include a reductant tank, a gaseous ammonia source, an injector, first conduit and a second conduit. The injector may receive the liquid reductant from the reductant tank and the gaseous ammonia from the gaseous ammonia source and inject the liquid reductant into a stream of exhaust gas in a first mode, inject the gaseous ammonia into the stream of exhaust gas in a second mode, and both the liquid reductant and the gaseous ammonia into the stream of exhaust gas in a third mode. The first conduit may communicate liquid reductant from the reductant tank to the injector. The second conduit may communicate gaseous ammonia from the gaseous ammonia source to the injector.

37 Claims, 10 Drawing Sheets

(56) References Cited

U.S. PATENT DOCUMENTS

| | | |
|---|---|---|
| 7,803,264 B2 | 9/2010 | Botte |
| 7,954,311 B2 * | 6/2011 | Shaikh .................. F01N 3/2066 60/266 |
| 8,069,827 B2 | 12/2011 | Watanabe et al. |
| 8,166,926 B2 | 5/2012 | Sasaki et al. |
| 8,388,920 B2 | 3/2013 | Botte |
| 8,491,842 B2 | 7/2013 | Johansen et al. |
| 8,562,929 B2 | 10/2013 | Botte |
| 8,740,113 B2 | 6/2014 | Roessle et al. |
| 8,911,699 B2 | 12/2014 | Colannino et al. |
| 8,978,364 B2 | 3/2015 | Olivier et al. |
| 9,057,304 B2 | 6/2015 | Huthwohl |
| 9,217,347 B2 | 12/2015 | Englert et al. |
| 9,790,830 B2 | 10/2017 | Sun |
| 2008/0073558 A1 | 3/2008 | Howell et al. |
| 2009/0095636 A1 | 4/2009 | Botte |
| 2010/0018476 A1 | 1/2010 | Zemskova et al. |
| 2010/0114463 A1 | 5/2010 | Leustek et al. |
| 2010/0319317 A1 | 12/2010 | Oberski et al. |
| 2011/0243823 A1 | 10/2011 | Botte |
| 2011/0302909 A1 | 12/2011 | Botte |
| 2013/0000729 A1 | 1/2013 | Mokire et al. |
| 2013/0064744 A1 | 3/2013 | Yacoub |
| 2013/0115141 A1 | 5/2013 | Han et al. |
| 2013/0292498 A1 | 11/2013 | Olivier et al. |
| 2014/0070031 A1 | 3/2014 | Lowry et al. |
| 2015/0064086 A1 | 3/2015 | Colannino et al. |
| 2017/0175603 A1 | 6/2017 | Sun |

FOREIGN PATENT DOCUMENTS

| | | |
|---|---|---|
| DE | 10047512 A1 | 8/2002 |
| DE | 10359522 A1 | 7/2005 |
| DE | 102014001879 A1 | 8/2015 |
| DE | 102014001880 A1 | 8/2015 |
| DE | 102014019427 A1 | 8/2015 |
| EP | 946254 A1 | 10/1999 |
| EP | 1355721 B1 | 10/2003 |
| EP | 1435458 A1 | 7/2004 |
| EP | 2411636 A1 | 2/2012 |
| EP | 02652279 B1 | 10/2013 |
| EP | 02871340 A1 | 5/2015 |
| KR | 2011-0083944 A1 | 7/2011 |
| WO | WO-2014070516 A1 | 5/2014 |

* cited by examiner

EXHAUST AFTERTREATMENT SYSTEM WITH AMMONIA GAS GENERATOR

CROSS-REFERENCE TO RELATED APPLICATIONS

This application is a U.S. National Phase Application under 35 U.S.C. 371 of International Application No. PCT/US2016/047700 filed on Aug. 19, 2016 and published as WO 2017/031396 A1 on Feb. 23, 2017. This application claims the benefit and priority of U.S. patent application Ser. No. 14/931,039, filed on Nov. 3, 2015. This application also claims the benefit and priority of German Patent Application No. 102015113835.2, filed on Aug. 20, 2015. The entire disclosures of the above applications are incorporated herein by reference.

FIELD

The present disclosure relates to an exhaust aftertreatment system with an ammonia gas generator.

BACKGROUND

This section provides background information related to the present disclosure and is not necessarily prior art.

In an attempt to reduce the quantity of $NO_X$ and particulate matter emitted to the atmosphere during internal combustion engine operation, a number of exhaust aftertreatment devices have been developed. A need for exhaust aftertreatment systems particularly arises when diesel combustion processes are implemented. Typical aftertreatment systems for diesel engine exhaust may include one or more of a diesel particulate filter (DPF), a selective catalytic reduction (SCR) system, a hydrocarbon (HC) injector, and a diesel oxidation catalyst (DOC). Typical SCR systems include a reductant delivery system for injecting a reductant (e.g., urea) upstream of an SCR catalyst.

More recently, reactors have been provided to generate ammonia gas from liquid reductant. Compared to liquid urea, gaseous ammonia is more reactive, more easily dispersed uniformly in the exhaust stream, and is more active over a wider temperature range. Therefore, the use of ammonia gas in an SCR system can improve the efficiency and effectiveness of the SCR system.

Reactors for generating ammonia gas are most effective when operating within a particular temperature range. Therefore, generation of ammonia gas may be delayed and/or hindered after a cold start of an engine. Accordingly, it may be desirable to provide an aftertreatment system that can effectively provide ammonia gas to an SCR catalyst immediately following a cold start of an engine.

SUMMARY

This section provides a general summary of the disclosure, and is not a comprehensive disclosure of its full scope or all of its features.

In one form, the present disclosure provides an exhaust aftertreatment system that may include a reductant tank, a gaseous ammonia source, an injector, first conduit and a second conduit. The injector may receive the liquid reductant from the reductant tank and the gaseous ammonia from the gaseous ammonia source. The injector may inject the liquid reductant into a stream of exhaust gas in a first mode and inject the gaseous ammonia into the stream of exhaust gas in a second mode. The first conduit may communicate liquid reductant from the reductant tank to the injector. The second conduit may communicate gaseous ammonia from the gaseous ammonia source to the injector.

In some configurations, the injector may simultaneously inject both the liquid reductant and the gaseous ammonia into the stream of exhaust gas in a third mode.

In some configurations, the injector is fluidly coupled with an exhaust pipe at a location upstream of a catalyst in the stream of exhaust gas.

In some configurations, the injector includes a liquid reductant input to receive the liquid reductant and a gaseous ammonia input to receive the gaseous ammonia.

In some configurations, an air tank facilitates injection of both the liquid reductant and the gaseous ammonia into the stream of exhaust gas.

In some configurations, the air tank is in fluid communication with an injector via a third conduit, and wherein air flow through a passage in the injector cools the injector.

In some configurations, a first control valve is disposed along the third conduit and controls fluid flow therethrough.

In some configurations, a pump pumps the fluid from the air tank to the exhaust stream.

In some configurations, the liquid reductant from the reductant tank and the gaseous ammonia from the gaseous ammonia source is mixed in a chamber within the injector.

In some configurations, an electrical heating element is in a heat transfer relationship with the air tank.

In some configurations, the first conduit includes a second valve to prevent backwards flow of the liquid reductant.

In some configurations, a control module controls the first valve positioning and the injection rate of the reductant-gaseous ammonia mixture.

In another form, the present disclosure provides an exhaust aftertreatment system that includes a reductant tank containing liquid reductant, a gaseous ammonia source, an air tank, a first conduit, a second conduit and a third conduit. The air tank facilitates injection of one or both of the liquid reductant and the gaseous ammonia into a stream of exhaust gas. The first conduit communicates liquid reductant from the reductant tank to the stream of exhaust gas. The second conduit communicates gaseous ammonia from the gaseous ammonia source to the stream of exhaust gas. The third conduit communicates fluid from the air tank to the stream of exhaust gas.

In some configurations, the exhaust aftertreatment system includes an injector that receives the gaseous ammonia from the second conduit and the air from the third conduit. The second and third conduits may be in communication with each other upstream of the injector.

In some configurations, a pump pumps the fluid from the air tank to the stream of exhaust gas.

In some configurations, an injector receives the liquid reductant from the reductant tank via the first conduit and the gaseous ammonia from the gaseous ammonia source via the second conduit and injects both the reductant and the gaseous ammonia into the stream of exhaust gas in a third mode.

In some configurations, the liquid reductant from the reductant tank and the gaseous ammonia from the gaseous ammonia source is mixed in a chamber within the injector.

In another form, the present disclosure provides a feeding device for feeding an additive into a mixing unit of an exhaust gas facility that include at least one first feeding channel, at least one second feeding channel, and a heating element. The at least one first feeding channel includes at least one first feed opening and the at least one second feeding channel includes at least one second feed opening.

The heating element is coupled to one of the at least one first feeding channel and the at least one second feeding channel to evaporate at least a part of the additive fed therethrough. The second feeding channel may be free of heating elements for evaporation.

In some configurations, the at least one first feeding channel is arranged in a first feeding unit and the at least one second feeding channel is arranged in a second feeding unit.

In some configurations, the first feeding unit and the second feeding unit are integrated in a housing, or the first feeding unit and the second feeding unit are in each case integrated in a separate housing.

In some configurations, the feeding device includes an exhaust gas facility.

In some configurations, the exhaust gas facility includes a mixing unit.

In another form, the present disclosure provides a method for introducing an additive into an exhaust gas facility by using a feeding device. The method includes feeding the additive through one of a first feed channel having a first feed opening and a second feed channel having a second feed opening, wherein feeding the additive to the exhaust gas facility via the first feeding channel results in the additive being at least partially evaporated, and wherein feeding the additive to the exhaust gas facility via the second channel results in the additive being fed in liquid form.

In some configurations, the additive is at least partially evaporated upstream of the first feeding channel and/or within the first feeding channel.

In some configurations, at least a portion of 50% to 80% or 70% of the mass of the additive guided through the first feeding channel or fed to the first feeding opening is evaporated.

In some configurations, between 60 g/h and 600 g/h of additive is fed to the exhaust gas through the first feeding channel.

In some configurations, a urea-water solution or a water-ammonia solution is used as an additive.

In another form, the present disclosure provides an exhaust aftertreatment system that may include a reductant tank, a reactor system, a storage tank, a first conduit and a second conduit. The reactor system may receive reductant from the reductant tank and may output gaseous ammonia. The storage tank may receive gaseous ammonia from the reactor system and may store a volume of gaseous ammonia. The first conduit may communicate gaseous ammonia from the reactor system to a stream of exhaust gas. The first conduit may bypass the storage tank. The second conduit may communicate gaseous ammonia from the storage tank to the stream of exhaust gas.

In some configurations, the reactor system could be an electrolysis reactor system, for example.

In some configurations, the first and second conduits are fluidly coupled with an exhaust pipe at a location upstream of a catalyst in the stream of exhaust gas.

In some configurations, the catalyst is a selective catalytic reduction catalyst.

In some configurations, the exhaust aftertreatment system includes a particulate filter and an oxidation catalyst. The particulate filter may be disposed upstream of the location and the selective catalytic reduction catalyst. The oxidation catalyst may be disposed upstream of the particulate filter.

In some configurations, the exhaust aftertreatment system includes a first heat exchanger in a heat transfer relationship with the reactor system. The first heat exchanger may transfer heat from exhaust gas to the reactor system.

In some configurations, the exhaust aftertreatment system includes an exhaust supply passageway fluidly coupling the stream of exhaust gas and the first heat exchanger so that exhaust gas from the stream of exhaust gas can flow through the first heat exchanger.

In some configurations, the exhaust supply passageway includes a valve controlling fluid flow therethrough.

In some configurations, the exhaust aftertreatment system also includes an exhaust return passageway fluidly coupling the stream of exhaust gas and the first heat exchanger. The exhaust supply and return passageways may be connected to the stream of exhaust gas upstream of a catalyst in the stream of exhaust gas.

In some configurations, the exhaust aftertreatment system includes an electrical heating element in a heat transfer relationship with the reactor system.

In some configurations, the exhaust aftertreatment system includes a second heat exchanger in which heat is transferred from the stream of exhaust gas to a working fluid. The first and second heat exchangers may be fluidly coupled to each other to allow a first flow of the working fluid therebetween.

In some configurations, the second heat exchanger is fluidly coupled to an engine to allow a second flow of the working fluid therebetween.

In some configurations, the exhaust aftertreatment system includes a valve controlling the first and second flows of the working fluid.

In some configurations, the exhaust aftertreatment system includes a Rankine cycle fluid circuit transferring heat from exhaust gas to working fluid. The first heat exchanger may receive the working fluid and transfer heat from the working fluid to the reactor system.

In some configurations, the exhaust aftertreatment system includes a first heat exchanger in a heat transfer relationship with the reactor system. The first heat exchanger may be fluidly coupled with an engine to allow communication of a working fluid therebetween. The first heat exchanger may transfer heat from the working fluid to the reactor system.

In some configurations, the exhaust aftertreatment system includes a second heat exchanger in a heat transfer relationship with the reductant tank, the second heat exchanger transferring heat from exhaust gas to the reductant tank; and a valve controlling flows of a heat transfer medium through the first and second heat exchangers.

In some configurations, the reactor system includes an electrolysis reactor unit and a separation unit (e.g., separating water or electrolyte) disposed downstream of the electrolysis reactor unit.

In some configurations, the exhaust aftertreatment system includes a heat exchanger in a heat transfer relationship with the electrolysis reactor unit and another heat exchanger in a heat transfer relationship with the water separator. The heat exchangers may transfer heat from exhaust gas to the electrolysis reactor unit and water separator.

In another form, the present disclosure provides an exhaust aftertreatment system that may include a reductant tank, a reactor system, a conduit, a first heat exchanger, a second heat exchanger and a valve. The reactor system may receive reductant from the reductant tank and output gaseous ammonia. The conduit may communicate gaseous ammonia from the reactor system to a stream of exhaust gas. The first heat exchanger may be in a heat transfer relationship with the reactor system. The first heat exchanger may transfer heat from exhaust gas to the reactor system. The second heat exchanger may be in a heat transfer relationship with the reductant tank. The second heat exchanger may transfer heat from exhaust gas to the reductant tank. The valve may control flows of a heat transfer medium through the first and second heat exchangers.

In some configurations, the exhaust aftertreatment system includes a storage tank receiving gaseous ammonia from the reactor system and storing a volume of gaseous ammonia; a first conduit communicating gaseous ammonia from the reactor system to a stream of exhaust gas, the first conduit bypassing the storage tank; and a second conduit communicating gaseous ammonia from the storage tank to the stream of exhaust gas, the first and second conduits fluidly coupled with an injector mounted upstream of a catalyst in the stream of exhaust gas.

In some configurations, the exhaust aftertreatment system includes an exhaust gas passageway fluidly coupling the stream of exhaust gas with the first and second heat exchangers so that exhaust gas from the stream of exhaust gas can flow through the first and second heat exchangers.

In some configurations, the exhaust aftertreatment system includes a third heat exchanger in which heat is transferred from the stream of exhaust gas to a working fluid. The first and second heat exchangers may be fluidly coupled to the third heat exchanger to allow the working fluid to flow between the first and third heat exchangers and between the second and third heat exchangers.

In some configurations, the third heat exchanger is fluidly coupled to an engine to allow the working fluid to flow therebetween.

In some configurations, the exhaust aftertreatment system includes an electrical heating element in a heat transfer relationship with the reactor system.

In another form, the present disclosure provides a method for treating exhaust gas discharged from a combustion engine. The method may include generating gaseous ammonia from a reductant; storing a first portion of the gaseous ammonia in a container; injecting a second portion of the gaseous ammonia into a stream of exhaust gas, the second portion of the gaseous ammonia being fluidly isolated from the container; and injecting gaseous ammonia from the container into the stream of exhaust gas in response to a cold start of the combustion engine.

In some configurations, the second portion of the gaseous ammonia is injected into the stream of exhaust gas through an opening (e.g., an injector, nozzle, orifice, etc.), and gaseous ammonia from the container is injected into the stream of exhaust gas through the same opening.

In some configurations, the method includes transferring heat from exhaust gas to a reactor system that generates the gaseous ammonia.

In some configurations, the method includes providing a first heat exchanger in a heat transfer relationship with the reactor system; and providing a Rankine cycle fluid circuit transferring heat from exhaust gas to working fluid. The first heat exchanger may receive the working fluid and transfer heat from the working fluid to the reactor system.

In some configurations, the method includes providing a first heat exchanger in a heat transfer relationship with the reactor system. The first heat exchanger may be fluidly coupled with the combustion engine to allow communication of a working fluid therebetween. The first heat exchanger may transfer heat from the working fluid to the reactor system.

In some configurations, the method includes providing a first heat exchanger in a heat transfer relationship with the reactor system. Transferring heat from exhaust gas to a reactor system may include routing exhaust gas through the first heat exchanger.

In some configurations, transferring heat from the exhaust gas to the reactor system includes transferring heat from the exhaust gas to a working fluid and subsequently transferring heat from the working fluid to the reactor system.

In some configurations, the method includes providing a first heat exchanger in a heat transfer relationship with the reactor system; and providing a second heat exchanger in which heat is transferred from the stream of exhaust gas to the working fluid. The first and second heat exchangers are fluidly coupled to each other to allow a first flow of the working fluid therebetween.

In some configurations, the second heat exchanger is fluidly coupled to the combustion engine to allow a second flow of the working fluid therebetween.

In some configurations, the method includes controlling the first and second flows of the working fluid based on operating parameters of the combustion engine.

In some configurations, the method includes heating the reactor system with an electrical heating element.

In another form, the present disclosure provides an injector for an exhaust aftertreatment system. The injector may include an injector body having a first port, a second port, a third port, a fourth port, and a fifth port. The first port may be in fluid communication with the third port and the fifth port. The second port may be in fluid communication with the fourth port. The second and fourth ports may be fluidly isolated from the first, third and fifth ports. The injector body may house a pintle that is movable between a closed position preventing fluid flow through the fifth port and an open position allowing fluid flow through the fifth port.

In some configurations, the first port is fluidly connected to a liquid reductant conduit, and the second port is fluidly connected to a conduit containing ammonia gas.

In some configurations, the third port forms a liquid-reductant outlet that is fluidly connected to a recirculation conduit coupled to a liquid reductant tank.

In some configurations, the fourth port is defined by an outer annular collar surrounding the fifth port.

In some configurations, the injector includes an intermediate annular collar extending from the injector body. The intermediate annular collar is surrounded by the outer annular collar and cooperates with the outer annular collar to define the fourth port.

In some configurations, the injector includes a tubular inner body that is surrounded by the intermediate annular collar. The tubular inner body may cooperate with the intermediate annular collar to define an annular passageway in fluid communication with the first port. The tubular inner body may define an inner passageway in fluid communication with the third port.

In some configurations, the pintle is disposed within the inner passageway.

In another form, the present disclosure provides another injector for an exhaust aftertreatment system. The injector may include an outer body and a pintle. The outer body may include a liquid inlet port receiving liquid reductant, a gas inlet port receiving gaseous ammonia, a liquid outlet port through which the liquid reductant exits the injector, and a gas outlet port through which the gaseous ammonia exits the injector. The pintle is disposed within the outer body and is movable between an open position allowing fluid flow through the liquid outlet port and a closed position preventing fluid flow through the liquid outlet port.

In some configurations, the gas outlet port is formed in an annular collar that surrounds the liquid outlet port.

In some configurations, the gas outlet port is an annular port that surrounds the liquid outlet port.

In some configurations, the annular collar includes an annular recess that surrounds a portion of the pintle and is in fluid communication with the gas inlet port and the gas outlet port. The annular recess may be axially spaced apart from the liquid outlet port.

In some configurations, the outer body includes a liquid-recirculation outlet port.

In some configurations, the liquid-recirculation port is in fluid communication with inner passage disposed within the outer body.

In some configurations, the pintle is at least partially disposed within the inner passage.

In some configurations, the outer body includes a first annular collar that defines a first annular passage at least partially surrounding a portion of the inner passage. The first annular passage may fluidly connect the liquid inlet port with the liquid outlet port.

In some configurations, the outer body includes a second annular collar that cooperates with the first annular collar to define the gas outlet port.

In some configurations, the gas outlet port is a second annular passage that at least partially surrounds at least a portion of the first annular passage.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 8a is a schematic representation of another configuration of the injector of FIGS. 7 and 8;

Corresponding reference numerals indicate corresponding parts throughout the several views of the drawings.

DETAILED DESCRIPTION

Figure 1:
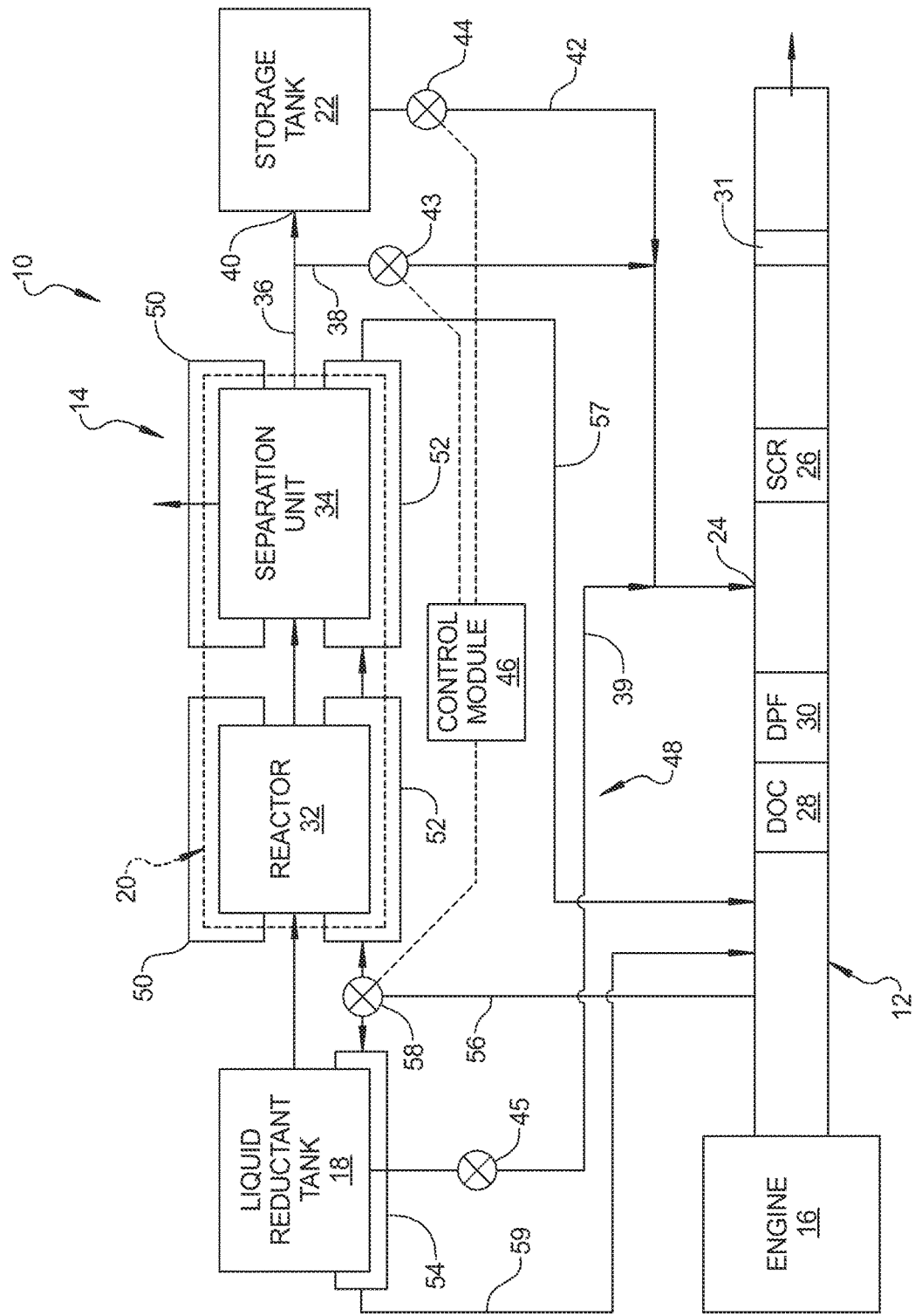
FIG. 1 is a schematic representation of an exhaust aftertreatment system including an electrolysis reactor system and gaseous ammonia storage tank according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, an exhaust aftertreatment system 10 is provided that may include an exhaust pipe 12 and an SCR system 14. A stream of exhaust gas from a combustion engine 16 may flow through the exhaust pipe 12. For example, the engine 16, exhaust pipe 12 and SCR system 14 can be installed on a vehicle (not shown). The SCR system 14 may include a reductant tank 18, a reactor system 20, a storage tank 22, an injector or feeding device 24 and an SCR catalyst 26. One or both of a reductant contained within the reductant tank 18 and gaseous ammonia (e.g., a gas having a large percentage of ammonia) generated by the reactor system 20 may be injected into the stream of exhaust gas in the exhaust pipe 12 through the injector 24 upstream of the SCR catalyst 26, which is housed within the exhaust pipe 12. In some configurations, the exhaust aftertreatment system 10 may also include an oxidation catalyst 28 and a particulate filter 30 disposed within the exhaust pipe 12 upstream of the injector 24. It will be appreciated that the injector 24 could be replaced with a nozzle, orifice or any other opening to the exhaust stream within the exhaust pipe 12. An ammonia slip catalyst 31 can be disposed downstream of the SCR catalyst 26. In some configurations, the particulate filter 30 may be an SCR coated diesel particulate filter, and the injector 24 could be disposed between the oxidation catalyst 28 and the filter 30.

The reactor system 20 can include a reactor unit 32 and a separation unit 34. For example, the reactor system 20 can be or include an electrolysis reactor similar or identical to the SCR GreenBox™ provided by E3 Clean Technologies or any other gaseous ammonia generating device. The separation unit 34 could separate water or electrolyte. Separated electrolyte may be recycled back to the reactor 32. Separated water could be routed through outlet 36, released to the atmosphere, or injected into the engine 16. The separation unit 34 could include a plurality of separators that separate gas/gas or gas/liquid. The separation unit 34 could be remove water from ammonia, electrolyte removed and/or recycled to the reactor, CO2/NH3 separation, and/or purify NH3. In some configurations, the reactor system 20 might not include the separation unit 34.

The reactor system 20 may receive reductant (e.g., a liquid comprising urea) from the reductant tank 18 and output gaseous ammonia (as well as gaseous carbon dioxide, carbon monoxide, hydrogen, etc.) through the outlet 36. The outlet 36 is fluidly coupled to a first conduit 38 and to an inlet 40 of the storage tank 22. The first conduit 38 is fluidly coupled to the injector 24 so that at least a portion of the gaseous ammonia output from the reactor system 20 can be injected into the stream of exhaust gas upstream of the SCR catalyst 26 in the exhaust pipe 12. A control valve 43 may control fluid flow through the first conduit 38.

Another portion of the gas output from the reactor system 20 can flow into the storage tank 22 through the inlet 40. The storage tank 22 may store a volume of gaseous ammonia that can be supplied to the injector 24 via a second conduit 42 when desired. The second conduit 42 may include a first control valve 44 that controls the flow of gaseous ammonia through the second conduit 42. In some configurations, a pump (not shown) may be provided to pump fluid from the storage tank 22 to the injector 24. The first control valve 44 may be in communication with a control module 46 that opens and closes the first control valve 44 based on operating parameters of the engine 16, operating parameters of the reactor system 20 and/or a flow rate of gaseous ammonia exiting the reactor system 20 through the outlet 36, for example. The control module 46 may open the first control valve 44 to allow a flow of gaseous ammonia from the storage tank 22 to the injector 24 in response to a cold start of the engine 16. In this manner, the gaseous ammonia from the storage tank 22 can be immediately available to be injected into the exhaust stream immediately following the cold start. This is advantageous because gaseous ammonia generation in the reactor system 20 may be hindered or prevented at low ambient temperatures when the vehicle in which the aftertreatment system 10 is installed has been off and has been exposed to low temperatures for a prolonged period of time. Once the reactor system 20 is able to generate gaseous ammonia at a rate that meets demand, the control module 46 may fully or partially close the first control valve 44.

The aftertreatment system 10 may include a heating system 48 operable to heat the reductant tank 18 and/or the reactor system 20 to facilitate efficient production of gaseous ammonia. The heating system 48 can include one or more electrical heating elements 50 in a heat transfer relationship with the reactor system 20 and/or the reductant tank 18. The control module 46 may control operation of the electrical heating elements 50 to maintain the reactor system 20 and/or reductant tank 18 at or above a desired minimum temperature.

The heating system 48 may also include one or more first heat exchangers 52 in a heat transfer relationship with the reactor system 20 and/or one or more second heat exchangers 54 in a heat transfer relationship with the reductant tank 18. The first and second heat exchangers 52, 54 may be fluidly coupled with the exhaust pipe 12 via an exhaust supply passageway 56. In this manner, heat from the exhaust gas flowing through the first and second heat exchangers 52, 54 can be transferred to the reactor system 20 and the reductant tank 18, respectively. After flowing through the first heat exchanger(s) 52, the exhaust gas may return to the exhaust pipe 12 through a first return passageway 57. Similarly, after flowing through the second heat exchanger 54, the exhaust gas may return to the exhaust pipe 12 through a second return passageway 59. The supply and return passageways 56, 57, 59 may be coupled to the exhaust pipe 12 at any suitable locations (i.e., upstream or downstream of any one or more of the oxidation catalyst 28, the particulate filter 30 and the SCR catalyst 26).

A second control valve 58 may be disposed along the exhaust passageway 56 and may be movable between a plurality of positions to prevent fluid communication between the exhaust pipe 12 and the first and second heat exchangers 52, 54 and to allow fluid communication between the exhaust pipe 12 and one or both of the first and second heat exchangers 52, 54. The control module 46 may be in communication with the second control valve 58 and may control the position of the second control valve 58 to control the flow of exhaust gas through the first and second heat exchangers 52, 54. The control module 46 may control the second control valve 58 based on temperatures of the reactor system 20, the reductant tank 18 and/or fluid within the reactor system 20 or reductant tank 18, for example. Additionally or alternatively, the control module 46 could control the second control valve 58 based on engine temperature, engine runtime and/or outdoor ambient temperature, for example.

With continued reference to FIG. 1, operation of the aftertreatment system 10 will be described in more detail. In response to a cold start of the engine 16, the control module 46 may open the first control valve 44 to allow gaseous ammonia from the storage tank 22 to be delivered to the exhaust stream in the exhaust pipe 12 through the second conduit 42 and the injector 24. As the reactor system 20 begins to generate gaseous ammonia following the cold start, that gaseous ammonia can also be communicated to the injector 24 through the first conduit 38. Once the rate of gas generation by reactor system 20 has increased to a level that at least matches a demand for the gaseous ammonia, the control module 46 can close the first control valve 44 to stop the flow of gaseous ammonia through the second conduit 42.

After the cold start of the engine 16, the reactor system 20 may need to be heated to facilitate the reactions therein to generate gaseous ammonia. Under such circumstances, the control module 46 may move the second control valve 58 to a position that allows exhaust gas from the exhaust pipe 12 to flow from the exhaust supply passageway 56 and through the first heat exchanger(s) 52, thereby heating the reactor system 20. After the reactor system 20 has been sufficiently heated, the control module 46 may cause the second control valve 58 to block the flow of exhaust gas to the first heat exchanger(s) 52 and allow exhaust gas to flow through the second heat exchanger 54 to heat the reductant tank 18. After the reductant tank 18 is sufficiently heated, the control module 46 may cause the second control valve 58 to block the flow of exhaust gas to the second heat exchanger 54. It will be appreciated that the control module 46 could cause the second control valve 58 to move to a position that allows exhaust gas to flow through the first and second heat exchangers 52, 54 simultaneously or individually, as desired. Additionally or alternatively, the control module 46 may activate or deactivate the electrical heating elements 50 at any time, as desired.

It will be appreciated that, in some configurations, the system 14 could include a bypass conduit 39 that directly connects the tank 18 with the injector 24 upstream of the SCR catalyst 26. A control valve 45 may control fluid flow through the bypass conduit 39 to selectively allow reductant from the tank 18 to bypass the reactor 32 and separation unit 34 and be injected into the exhaust stream upstream of the SCR catalyst 26. In some configurations, a mixing device could be disposed with or upstream of the injector 24 in which liquid reductant from the bypass conduit 39 and gaseous ammonia from the second conduit 42 may mix prior to being injected into the exhaust pipe 12 through a common outlet of the injector 24.

In some configurations, immediately after a cold start, the second control valve 58 may channel some or all of the exhaust gas to the second heat exchanger 54 to first thaw liquid within the tank 18, During this time, reductant from the tank 18 may be injected directly into the exhaust stream (i.e., bypassing the reactor 32 and separation unit 34) through the bypass conduit described above. After warm up, heat is diverted to promote gaseous conversion. After the reductant in the tank 18 is warmed up, the second control valve 58 may allow exhaust gas into the first heat exchangers 52.

In some configurations, the tank 18 may include a pressure-relief valve that can vent the tank 18 in response to the creation of high pressure ammonia in the tank 18 as the tank 18 is heated. Excess ammonia could be vented from the tank 18 to a low-pressure point upstream of the injector 24, for example. In some configurations, the storage tank 22 may include a pressure-relief valve that can vent the storage tank 22 in response to the creation of high pressure ammonia in the storage tank 22. Excess gaseous ammonia could be vented to a location in the exhaust pipe 12 upstream of the ammonia slip catalyst 31 or to the atmosphere, for example.

Figure 2:
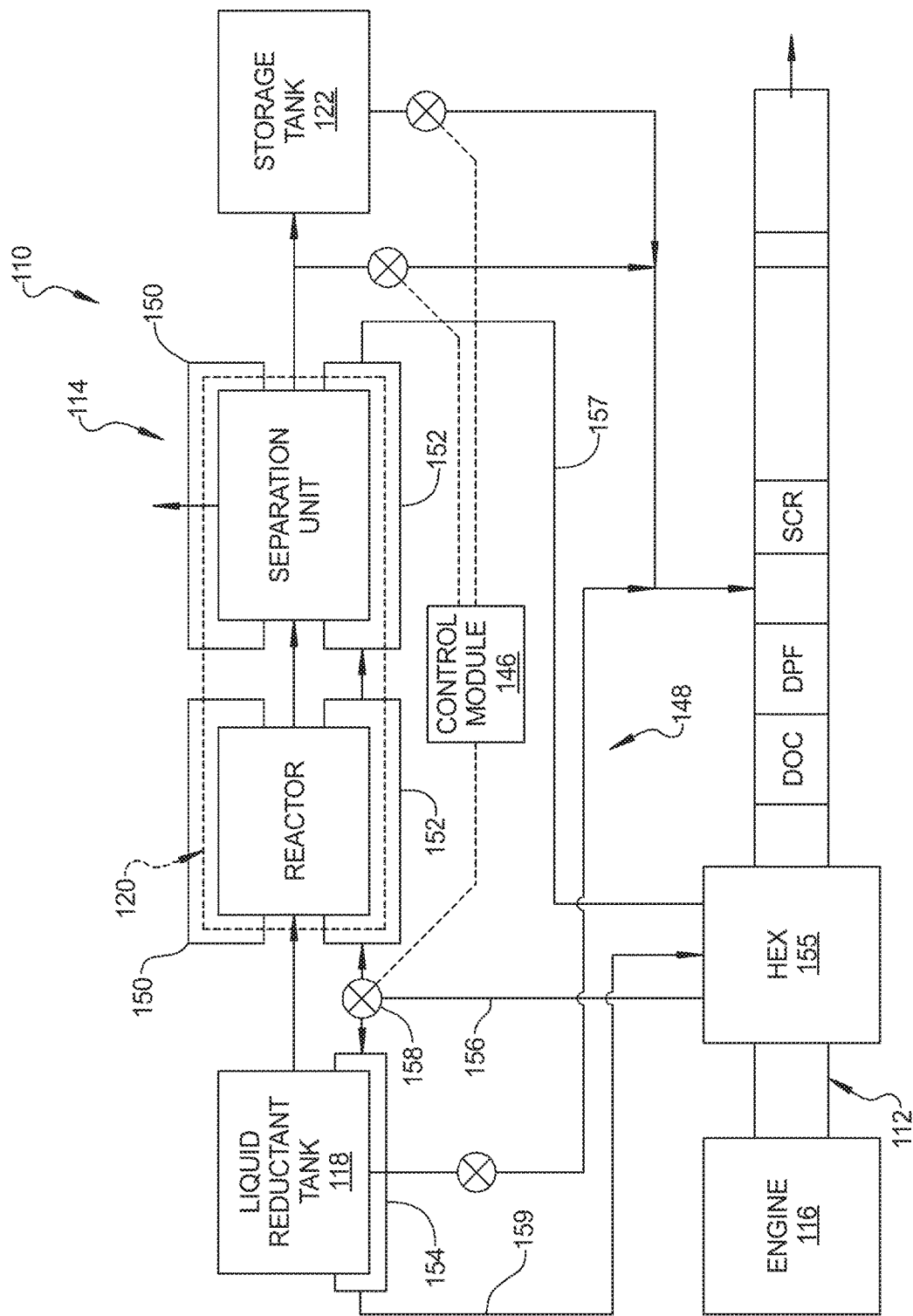
FIG. 2 is a schematic representation of another exhaust aftertreatment system including an electrolysis reactor system and gaseous ammonia storage tank according to the principles of the present disclosure.

With reference to FIG. 2, another exhaust aftertreatment system 110 is provided that may include an exhaust pipe 112, an SCR system 114 and a heating system 148 and may treat exhaust gas discharged from a combustion engine 116. The exhaust pipe 112, SCR system 114 and heating system 148 can be structured and function similarly or identically to the exhaust pipe 12, SCR system 14 and heating system 48, respectively, apart from any exceptions described below. Therefore, similar features will not be described again in detail.

Like the SCR system 14, the SCR system 114 may include a reductant tank 118, a reactor system 120 and a storage tank 122. The SCR system 114 may generate and store gaseous ammonia and provide gaseous ammonia to the exhaust stream within the exhaust pipe 112. Like the heating system 48, the heating system 148 may include one or more first heat exchangers 152 in a heat transfer relationship with the reactor system 120 and a second heat exchanger 154 in a heat transfer relationship with the reductant tank 118.

The first and second heat exchangers 152, 154 may be in fluid communication with a third heat exchanger 155. The third heat exchanger 155 may be disposed in or adjacent the exhaust pipe 112 so that a working fluid (e.g., a coolant) flowing through the third head exchanger 155 can absorb heat from exhaust gas flowing through the exhaust pipe 112. A supply passageway 156 and first and second return passageways 157, 159 can fluidly connect the third heat exchanger 155 with the first and second heat exchangers 152, 154 and form a closed loop therebetween. A pump (not shown) can circulate the working fluid among the first, second and third heat exchangers 152, 154, 155.

A control valve 158 may be disposed along the supply passageway 156 and may be movable between a plurality of positions to prevent fluid communication between the third heat exchanger 155 and the first and second heat exchangers 152, 154 and to allow fluid communication between the third heat exchanger 155 and one or both of the first and second heat exchangers 152, 154. A control module 146 may be in communication with the control valve 158 and may control the position of the control valve 158 to control the flow of working fluid through the first and second heat exchangers 152, 154. The control module 146 may control the control valve 158 based on temperatures of the reactor system 120, the reductant tank 118 and/or fluid within the reactor system 120 or reductant tank 118, for example. Additionally or alternatively, the control module 146 could control the control valve 158 based on engine temperature, engine runtime and/or outdoor ambient temperature, for example. Additionally or alternatively, the control module 146 can may activate or deactivate the electrical heating elements 150 at any time to heat the reactor system 120, as desired.

Figure 3:
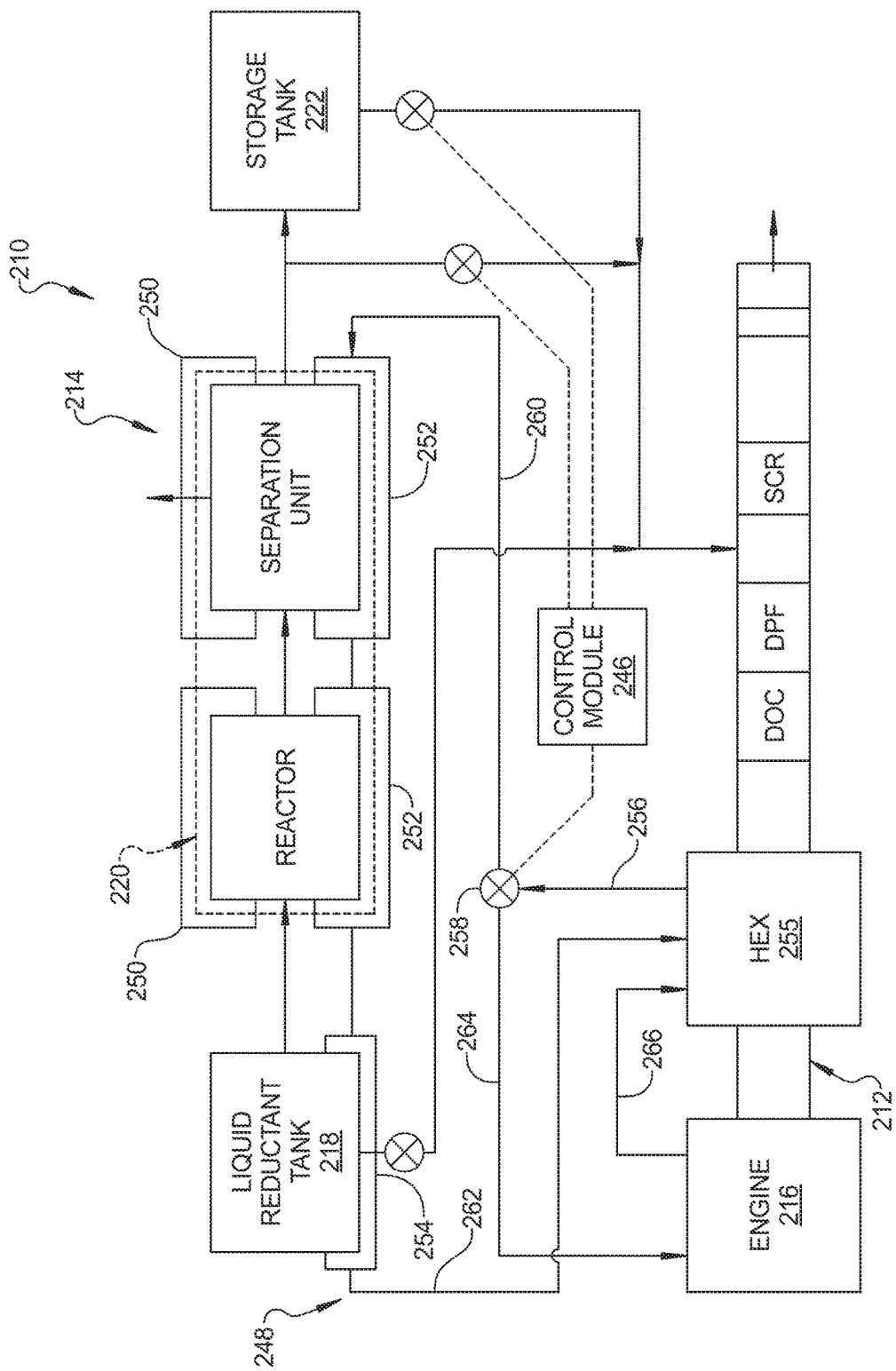
FIG. 3 is a schematic representation of yet another exhaust aftertreatment system including an electrolysis reactor system and gaseous ammonia storage tank according to the principles of the present disclosure.

With reference to FIG. 3, another exhaust aftertreatment system 210 is provided that may include an exhaust pipe 212, an SCR system 214 and a heating system 248 and may treat exhaust gas discharged from a combustion engine 216. The exhaust pipe 212, SCR system 214 and heating system 248 can be structured and function similarly or identically to the exhaust pipe 12, 112, SCR system 14, 114 and heating system 48, 148, respectively, apart from any exceptions described below. Therefore, similar features will not be described again in detail.

Like the SCR system 14, the SCR system 214 may include a reductant tank 218, a reactor system 220 and a storage tank 222. The SCR system 214 may generate and store gaseous ammonia and provide gaseous ammonia to the exhaust stream within the exhaust pipe 212. Like the heating systems 48, 148, the heating system 248 may include one or more first heat exchangers 252 in a heat transfer relationship with the reactor system 220 and a second heat exchanger 254 in a heat transfer relationship with the reductant tank 218.

The first and second heat exchangers 252, 254 may be in fluid communication with a third heat exchanger 255. The third heat exchanger 255 may be disposed in or adjacent the exhaust pipe 212 so that a working fluid (e.g., a coolant) flowing through the third head exchanger 255 can absorb heat from exhaust gas flowing through the exhaust pipe 212. The third heat exchanger 255 may also be in fluid communication with coolant passages in the engine 216 so that coolant can warm the engine 216 after a cold start.

First and second supply passageways 256, 260 and a first return passageway 262 can fluidly connect the third heat exchanger 255 with the first and second heat exchangers 252, 254. The first supply passageway 256, a third supply passageway 264 and a second return passageway 266 may fluidly connect the third heat exchanger 255 with the engine 216. A pump (not shown) can circulate the working fluid among the first, second and third heat exchangers 252, 254, 255 and the engine 216. A bypass conduit and bypass valve may be provided to selectively allow working fluid to bypass the reductant tank 218 if the reductant tank 218 gets too hot. While FIG. 3 depicts the supply passage 260 and the return passage 262 being configured such that the working fluid flows through the reactor system 220 before the tank reductant 218, in some configurations, the passages 260, 262 could be configured such that the working fluid flows to the reductant tank 218 before the reactor system 220.

A control valve 258 may be disposed along the first supply passageway 256 and may be movable between a plurality of positions to control fluid communication between the first, second and third heat exchangers 252, 254, 255 and to control fluid communication between the third heat exchanger 255 and the engine 216. A control module 246 may be in communication with the control valve 258 and may control the position of the control valve 258 to allow and prevent a flow of working fluid through the first and second heat exchangers 152, 154 and/or through the engine 216. The control module 246 may control the control valve 258 based on temperatures of the reactor system 220, the reductant tank 218 and/or fluid within the reactor system 220 or reductant tank 218, for example. Additionally or alternatively, the control module 246 could control the control valve 258 based on engine temperature, engine runtime and/or outdoor ambient temperature, for example. Additionally or alternatively, the control module 246 can may activate or deactivate the electrical heating elements 250 at any time to heat the reactor system 220, as desired.

Figure 4:
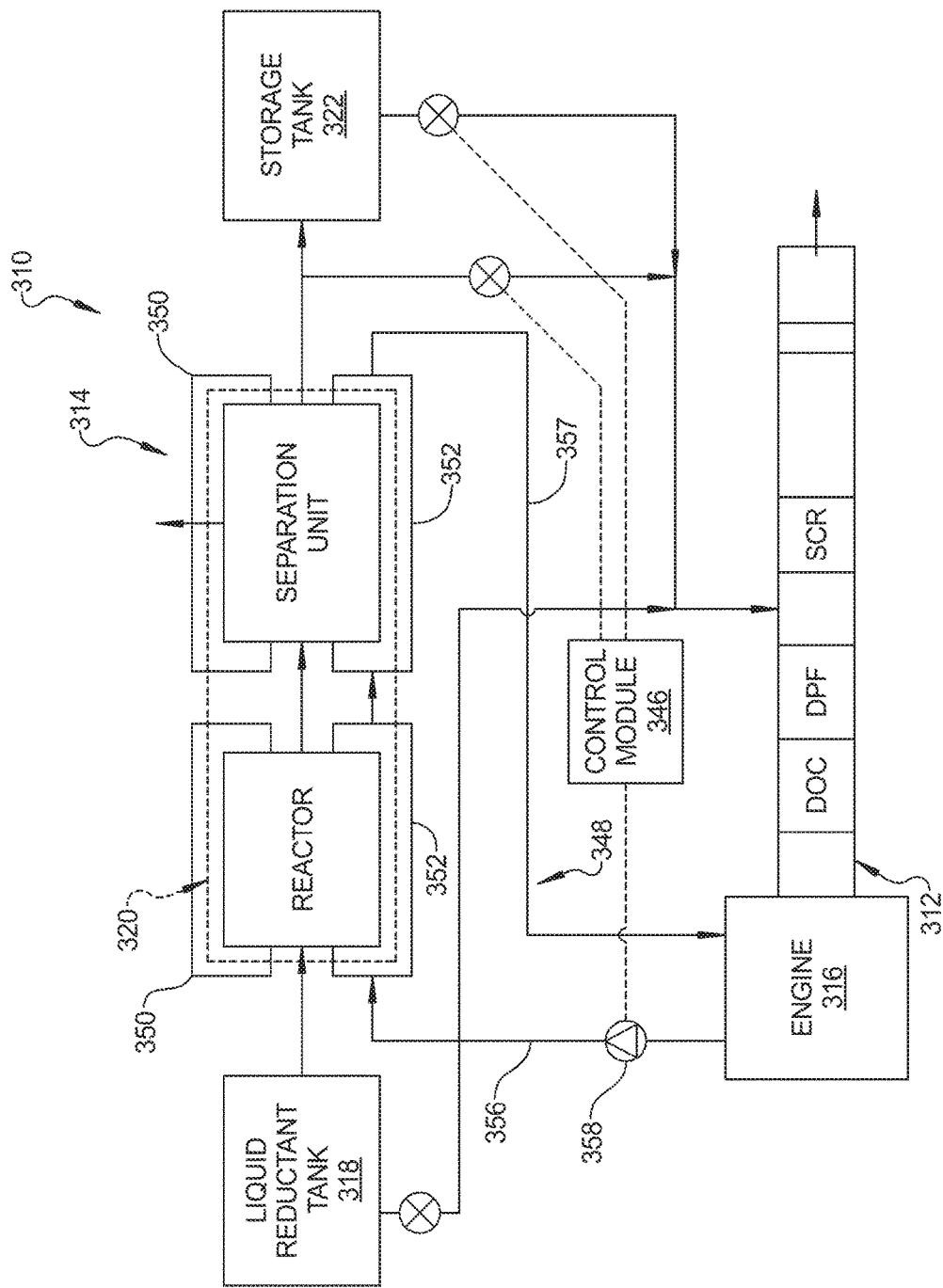
FIG. 4 is a schematic representation of yet another exhaust aftertreatment system including an electrolysis reactor system and gaseous ammonia storage tank according to the principles of the present disclosure.

With reference to FIG. 4, another exhaust aftertreatment system 310 is provided that may include an exhaust pipe 312, an SCR system 314 and a heating system 348 and may treat exhaust gas discharged from a combustion engine 316. The exhaust pipe 312, SCR system 314 and heating system 348 can be structured and function similarly or identically to the exhaust pipe 12, SCR system 14 and heating system 48, respectively, apart from any exceptions described below. Therefore, similar features will not be described again in detail.

Like the SCR system 14, the SCR system 314 may include a reductant tank 318, a reactor system 320 and a storage tank 322. The SCR system 314 may generate and store gaseous ammonia and provide gaseous ammonia to the exhaust stream within the exhaust pipe 312. Like the heating systems 48, 148, 248, the heating system 348 may include one or more first heat exchangers 352 in a heat transfer relationship with the reactor system 320.

The first heat exchanger(s) 352 may be in fluid communication with coolant passages in the engine 316 via a coolant supply passageway 356 and a return passageway 357. A pump 358 may circulate working fluid between the first heat exchangers 352 and the engine 316. A control module 346 may be in communication with the pump 358 and may control operation of the pump 358 to start and stop a flow of working fluid through the first heat exchangers 352 and the engine 316. The control module 346 may control the pump 358 based on a temperature of the reactor system 320 and/or fluid within the reactor system 320, for example. Additionally or alternatively, the control module 346 could control the pump 358 based on engine temperature, engine runtime and/or outdoor ambient temperature, for example. Additionally or alternatively, the control module 346 can may activate or deactivate the electrical heating elements 350 at any time to heat the reactor system 320, as desired. In some configurations, the pump 358 may also circulate working fluid through another heat exchanger that heats the reductant tank 318.

Figure 5:
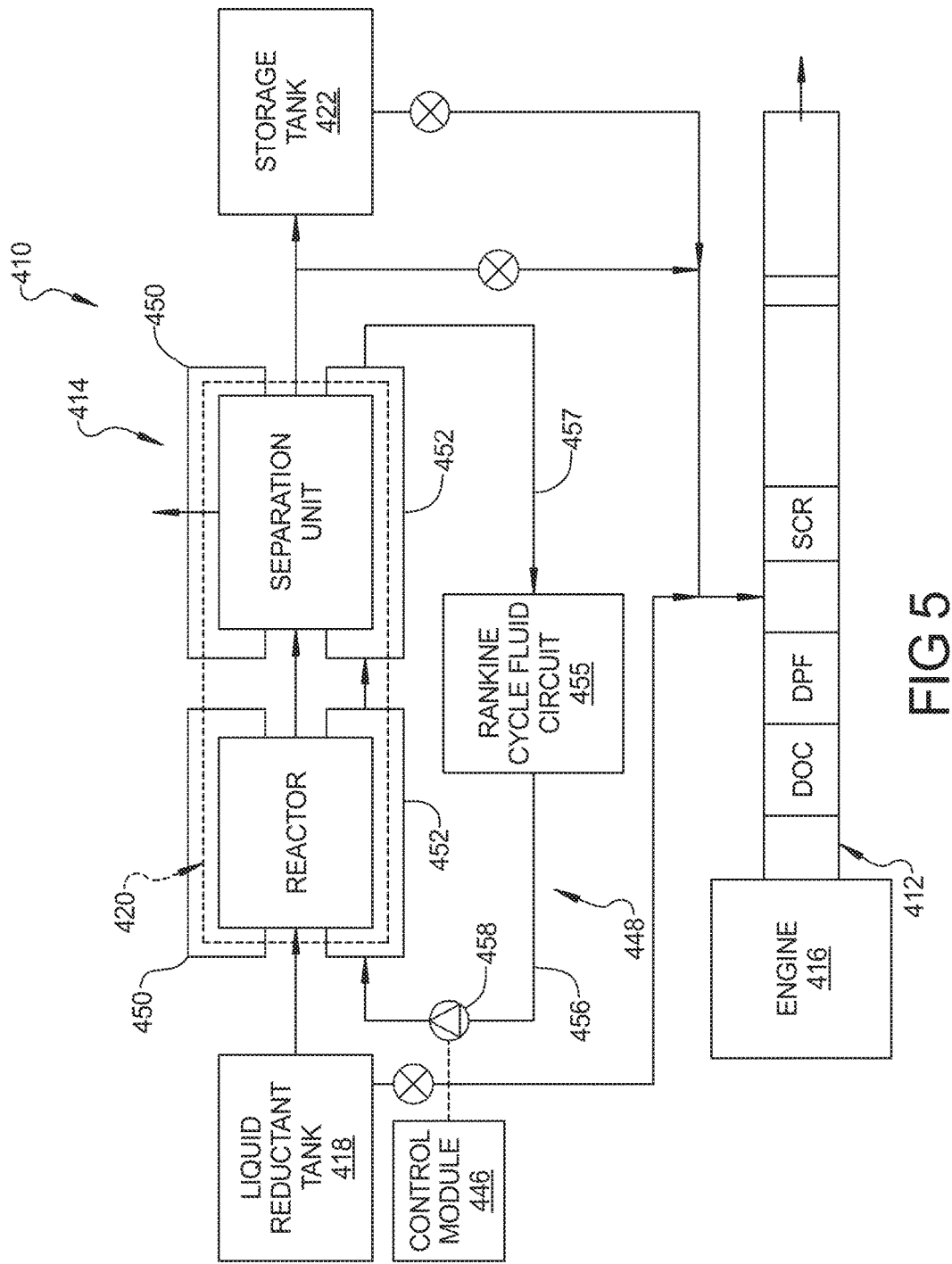
FIG. 5 is a schematic representation of yet another exhaust aftertreatment system including an electrolysis reactor system and gaseous ammonia storage tank according to the principles of the present disclosure.

With reference to FIG. 5, another exhaust aftertreatment system 410 is provided that may include an exhaust pipe 412, an SCR system 414 and a heating system 448 and may treat exhaust gas discharged from a combustion engine 416. The exhaust pipe 412, SCR system 414 and heating system 448 can be structured and function similarly or identically to the exhaust pipe 12, SCR system 14 and heating system 48, respectively, apart from any exceptions described below. Therefore, similar features will not be described again in detail.

Like the SCR system 14, the SCR system 414 may include a reductant tank 418, a reactor system 420 and a storage tank 422. The SCR system 414 may generate and store gaseous ammonia and provide gaseous ammonia to the exhaust stream within the exhaust pipe 412. Like the heating systems 48, 148, 248, 348, the heating system 448 may include one or more first heat exchangers 452 in a heat transfer relationship with the reactor system 420.

The first heat exchanger(s) 452 may be in a heat transfer relationship with waste heat recovery system, such as a Rankine cycle fluid circuit 455. The Rankine cycle fluid circuit 455 may circulate a first working fluid that absorbs heat from exhaust gas discharged from the engine 416. The first heat exchanger(s) 452 may be in fluid communication with a heat exchanger of the Rankine cycle fluid circuit 455 via a supply passage 456 and a return passage 457 such that first heat exchanger(s) 452 receive a second working fluid that absorbs heat from the first working fluid in the heat exchanger of the Rankine cycle fluid circuit 455. It will be appreciated that the first and second working fluids could be the same type or different types of working fluids.

A pump 458 may circulate working fluid between the first heat exchangers 452 and the Rankine cycle fluid circuit 455. A control module 446 may be in communication with the pump 458 and may control operation of the pump 458 to start and stop a flow of working fluid through the first heat exchangers 452. The control module 446 may control the pump 458 based on a temperature of the reactor system 420 and/or fluid within the reactor system 420, for example. Additionally or alternatively, the control module 446 could control the pump 458 based on engine temperature, engine runtime and/or outdoor ambient temperature, for example. Additionally or alternatively, the control module 446 may activate or deactivate the electrical heating elements 450 at any time to heat the reactor system 420, as desired. In some configurations, the pump 458 may also circulate working fluid through another heat exchanger that heats the reductant tank 418.

Figure 6:
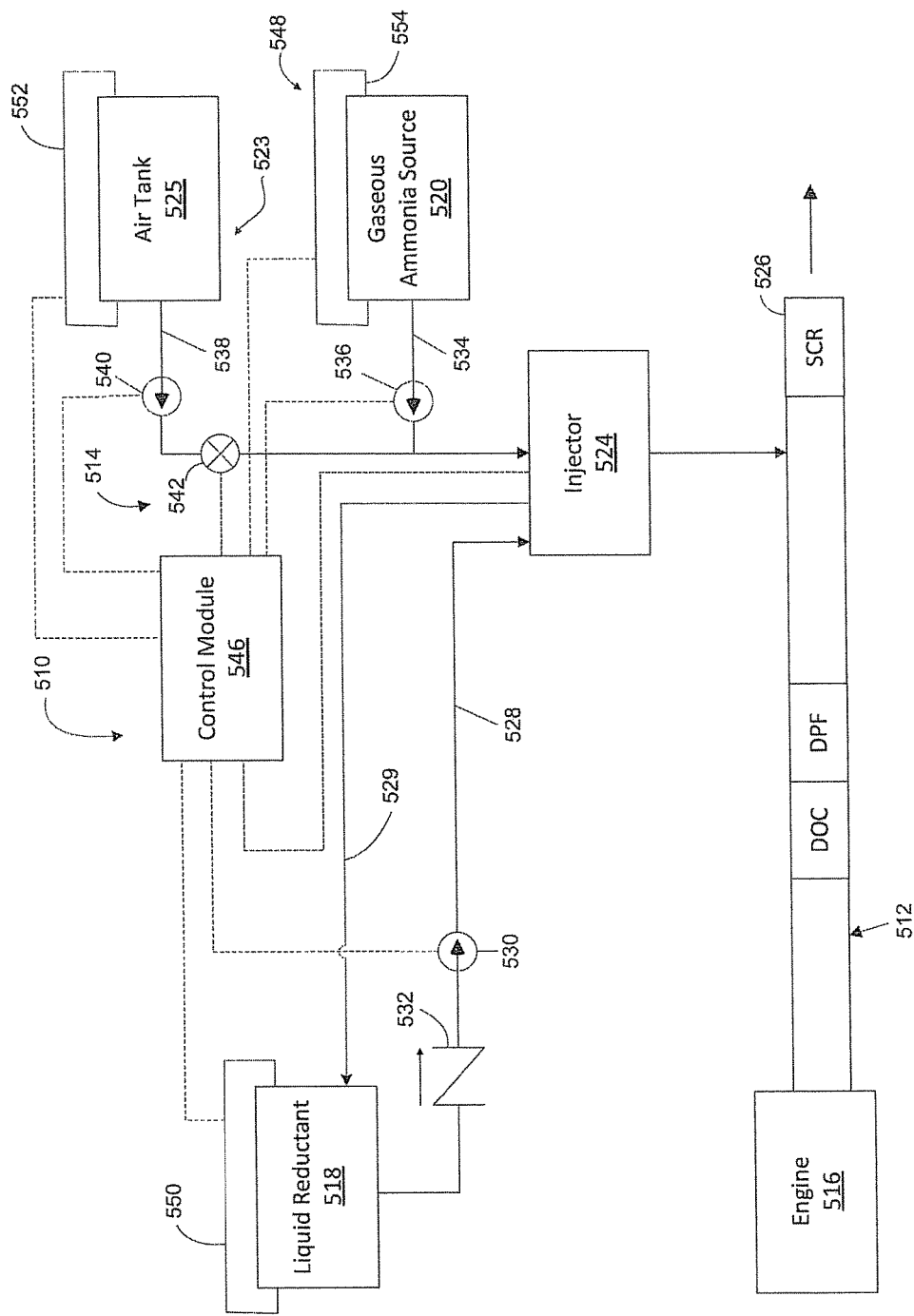
FIG. 6 is a schematic representation of yet another exhaust aftertreatment system including an SCR system according to the principles of the present disclosure.

With reference to FIG. 6, another exhaust aftertreatment system 510 is provided that may include an exhaust pipe 512, a reductant delivery system 514 and a heating system 548 and may treat exhaust gas discharged from a combustion engine 516.

The reductant delivery system 514 may include a liquid reductant tank 518, an ammonia source 520, an injector or feeding device 524, a pressurized air source 523 (which may include an air tank 525 and/or a pump 540), and an SCR catalyst 526. The liquid reductant contained in the reductant tank 518 may be supplied to the injector 524 via a first conduit 528 in a first mode. A first pump 530 may pump the liquid reductant from the reductant tank 518 to the injector 524. A check valve 532 may be disposed along the first conduit 528 to prevent the backward flow of the reductant.

The ammonia source 520 may include an ammonia generator (e.g., the reactor system 20 shown in FIG. 1 or any other reactor system or ammonia generation device) that generates gaseous ammonia and/or an ammonia gas storage device (e.g., the storage tank 22 shown in FIG. 1) that stores gaseous ammonia. The ammonia gas may be supplied to the injector 524 via a second conduit 534 in a second mode. A second pump 536 may pump the ammonia gas from the ammonia source 520 to the injector 524. While the second pump 536 is shown in FIG. 6 as being disposed along the second conduit 534, in some configurations, the second pump 536 may be positioned off of the second conduit 534 and may pressurize the ammonia source 520.

The injector 524 is fluidly coupled to the exhaust pipe 512 at a location upstream of the SCR catalyst 526. The injector 524 may receive both the liquid reductant from the reductant tank 518 and the ammonia gas from the ammonia source 520 via a reductant input (not shown) and a gaseous ammonia input (not shown), respectively, and inject one or both of the liquid reductant and the ammonia gas into the stream of exhaust gas. If both the liquid reductant and the gaseous ammonia are injected into the stream of exhaust gas in a third mode, the liquid reductant and the ammonia gas may mix in a chamber (not shown) within the injector 524 prior to being injected into the stream of exhaust gas. In some configurations, the liquid reductant and the ammonia gas may mix in a mixing device (not shown) upstream of the injector 524. The injector 524 may be in communication with a control module 546 that regulates the injection and injection rate of one or both of the liquid reductant and the ammonia gas into the stream of exhaust gas based on operating parameters of the engine 516 and/or a flow rate of gaseous ammonia exiting the ammonia source 520, for example.

The air tank 525 contains a compressed fluid (e.g. pressurized air) and is in fluid communication with the stream of exhaust gas via a third conduit 538 and the injector 524, thereby facilitating injection of one or both of the liquid reductant and the ammonia gas to the stream of exhaust gas. A third pump 540 may pump the fluid from the air tank 525 to the stream of exhaust gas and a control valve 542 controls the flow of fluid through the third conduit 538. In some configurations, a mixing device (not shown) could be disposed upstream of the injector 524 and downstream of the control valve 542 and second pump 534 in which pressurized air and gaseous ammonia may mix. While the third pump 540 is shown in FIG. 6 as being disposed along the third conduit 538, in some configurations, the third pump 540 may be positioned off of the third conduit 538 and may pressurize the air tank 525. In configurations of the pressurized air source 523 that do not include the air tank 525, the third pump 540 may draw air from the ambient environment or any other volume of air. Furthermore, while the control valve 542 is shown in FIG. 6 as being positioned upstream of the intersection of the second and third conduits 534, 538, in some configurations, the control valve 542 could be disposed between the injector 524 and the intersection of the second and third conduits 534, 538. The control module 546 may be in communication with the control valve 542 to open and close the control valve 542 based on operating parameters of the engine 516 and/or a flow rate of gaseous ammonia exiting the ammonia source 520, for example. Additionally or alternatively, the control module 546 could control the control valve 542 based on engine temperature, engine runtime and/or outdoor ambient temperature, for example.

The aftertreatment system 510 may include the heating system 548 operable to heat the reductant tank 518, the air tank 525, and the ammonia source 520. The heating system 548 may include electrical heating elements 550, 552, 554 in a heat transfer relationship with the reductant tank 518, the air tank 525, and the ammonia source 520, respectively. The control module 546 may control operation of the electrical heating elements 550, 552, 554 to maintain the reductant tank 518, the air tank 525, and ammonia source 520, respectively, at or above a desired minimum temperature.

With continued reference to FIG. 6, operation of the aftertreatment system 10 will be described in more detail. In response to a cold start of the engine 516 (which may include conditions were the exhaust gas from the engine 516 is above the activation temperature of the SCR 526, but below a temperature at which liquid reductant can change phase to gas), gaseous ammonia stored in the ammonia source 520 may be delivered to the exhaust stream in the exhaust pipe 512 through the second conduit 534 and the injector 524. After the cold start of the engine 516, the ammonia source 520 may need to be heated to facilitate the reactions therein to generate gaseous ammonia. Under such circumstances, the control module 546 may activate the electrical heating element 554.

Immediately after a cold start, the control module 546 may activate the electrical heating element 550 to thaw liquid within tank 518. During this time, the liquid reductant from the tank 518 may be delivered to the injector 524 through the first conduit 528 and the control module 546 may operate to inject the liquid reductant into the exhaust stream in the exhaust pipe 512 instead of the gaseous ammonia.

In some configurations, the control module 546 may operate the injector 524 to inject a mixture of the liquid reductant from the reductant tank 518 and the gaseous ammonia from the ammonia source 520 into the stream of exhaust gas. The air tank 525 may deliver fluid therefrom to the injector 524 via the third conduit 538 to facilitate injection of the mixture of the liquid reductant and the gaseous ammonia into the stream of exhaust gas. The control module 546 may operate to control the positioning of the control valve 542 such that an optimum amount of fluid from the air tank 525 is provided at any given time to facilitate the injection of the mixture of the liquid reductant and the gaseous ammonia into the stream of exhaust gas. It will be appreciated that the air tank 525 may also facilitate injection of the liquid reductant and gaseous ammonia into the stream of exhaust independently of one another.

The control module 546 may activate the heating element 552 to preheat the fluid in the air tank 525 such that the desired system efficiency may be achieved. The check valve 532 disposed along the first conduit 528 prevents the fluid from the air tank 525 from causing a reverse flow in the first conduit 528.

The control module 546 may also be in communication with and control operation of the first pump 530, the second pump 536, and the third pump 540.

In some configurations, the injector 524 may be fluidly coupled to a recirculation conduit 529 through which liquid reductant received by the injector 524 from the first conduit 528 can be returned to the liquid reductant tank 518. Recirculating liquid reductant from the injector 524 to the liquid reductant tank 518 through the recirculation conduit 529 can be used to promote cooling of the injector 524. In some configurations, air from the air tank 525 and/or gas from ammonia source 520 can be used to cool the injector 524 by flowing around heat sensitive components of the injector 524.

Figure 7:
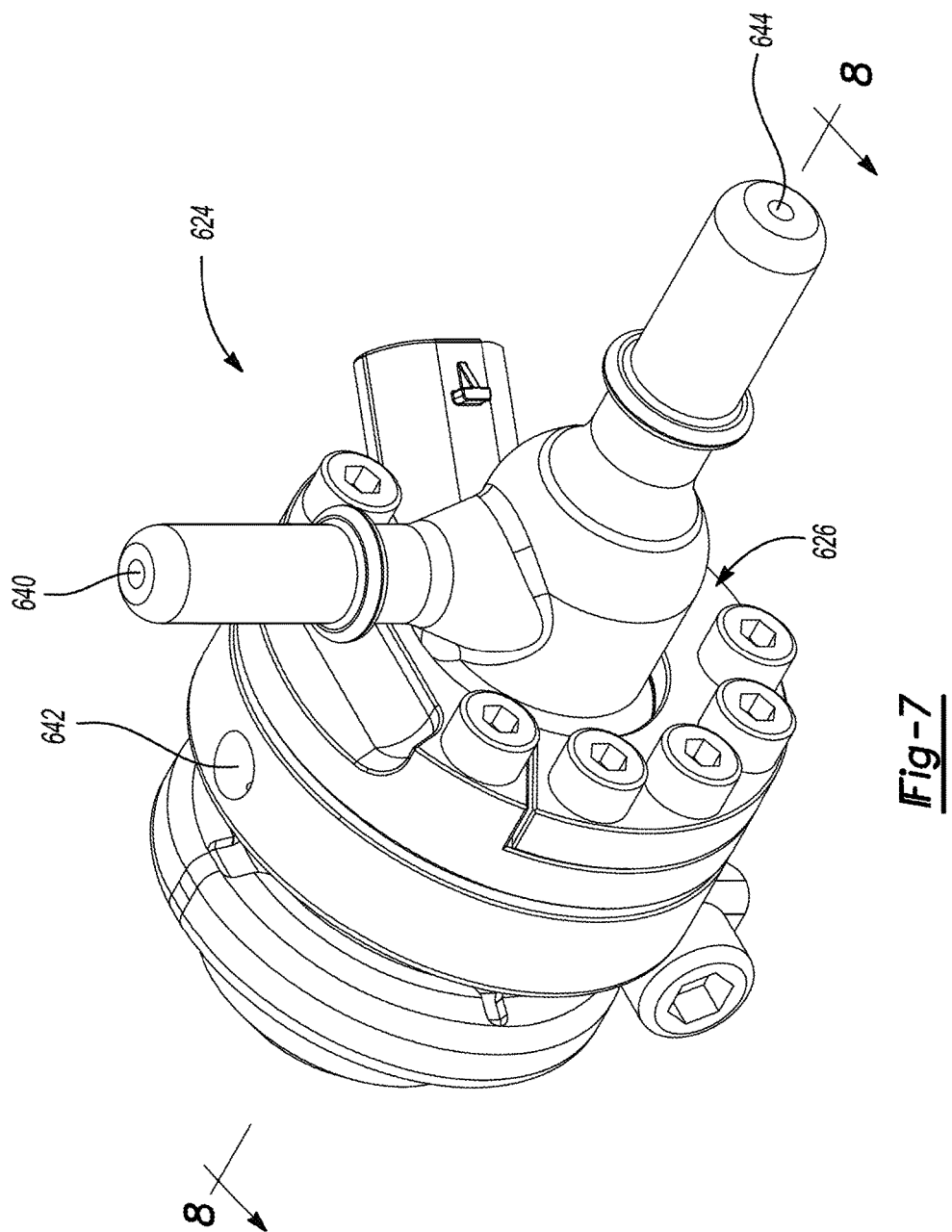
FIG. 7 is a perspective view of an injector that can be incorporated into the exhaust aftertreatment system of FIG. 6.
Figure 8:
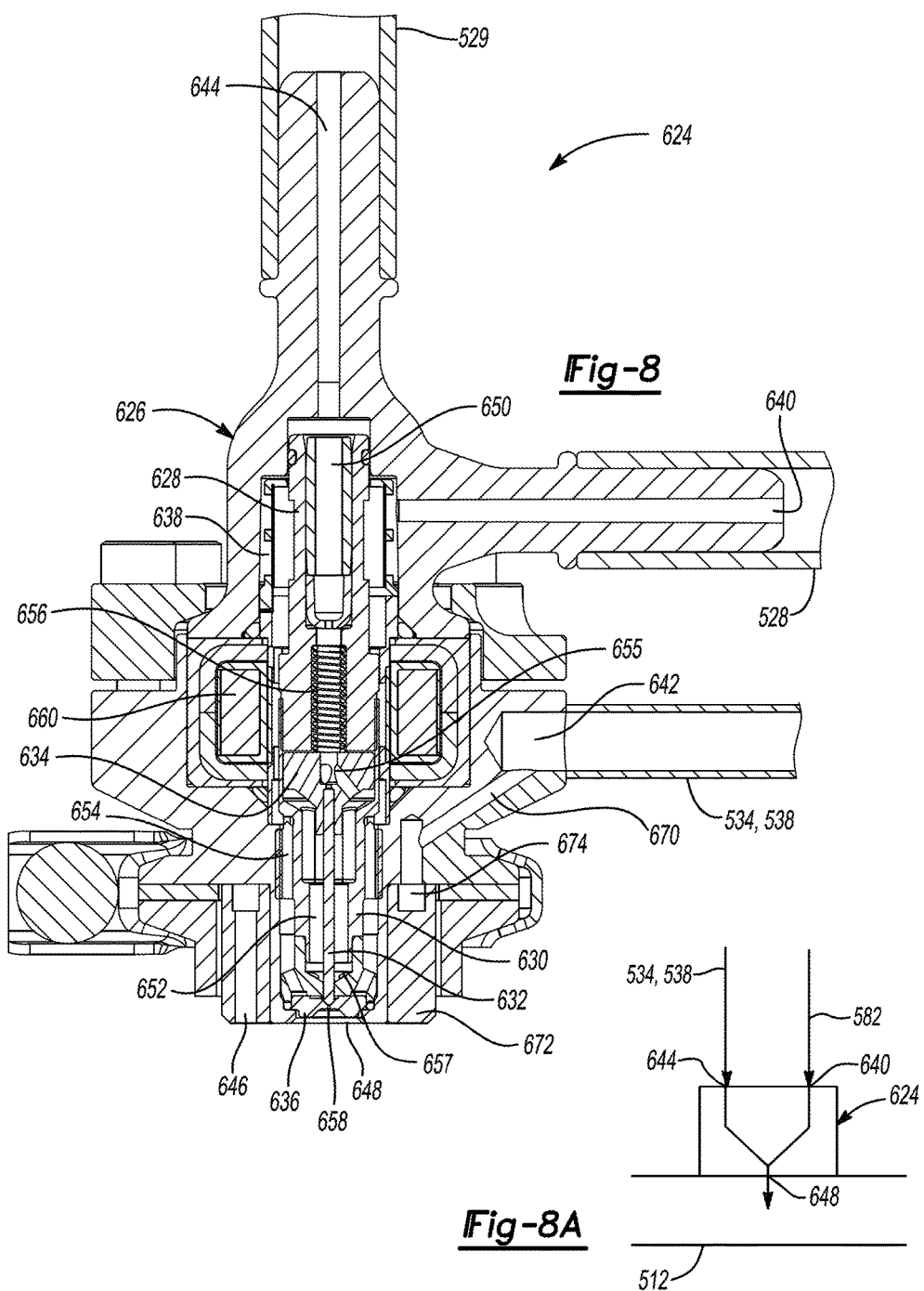
FIG. 8 is a cross-sectional view of the injector of FIG. 7.

With reference to FIGS. 7 and 8, an injector 624 is provided that can be incorporated into the exhaust aftertreatment system 510 instead of the injector 524. The injector 624 may include an outer injector body 626, a first inner injector body 628, a second inner injector body 630, a pintle 632, a pintle head 634, and an orifice plate 636. The outer injector body 626 may include an inner cavity 638 in which the inner injector bodies 628, 630, pintle 632, pintle head 634 and orifice plate 636 are disposed. The outer injector body 626 may also include a first port (e.g., liquid reductant inlet) 640, a second port (e.g., a gaseous ammonia inlet) 642, a third port (e.g., a recirculation outlet) 644, a fourth port (e.g., a gaseous ammonia outlet) 646, and a fifth port (e.g., a liquid reductant outlet) 648. The first, third, and fifth ports 640, 644, 648 may be in fluid communication with the cavity 638. The second and fourth ports 642, 646 are in fluid communication with each other and may be fluidly isolated from the cavity 638.

The first and second inner injector bodies 628, 630 may be generally tubular members that define first and second inner passageways 650, 652, respectively, that are in fluid communication with each other and the third port 644. The first and second inner injector bodies 628, 630 may cooperate to define an annular outer passageway 654 that surrounds the inner passageways 650, 652. The second inner injector body 630 is disposed axially between the first inner injector body 628 and the orifice plate 636. An end of the second inner injector body 630 may include one or more apertures 657 that allow for fluid communication between the annular outer passageway 654 and the second inner passageway 652.

The pintle 632 and the pintle head 634 are attached to each other and are disposed within the second inner injector body 630. The pintle head 634 is attached to one end of the pintle 632, and the other end of the pintle 632 selectively seats against the orifice plate 636. The pintle head 634 may include one or more apertures 655 that provide fluid communication between the first and second inner passageways 654.

A spring 656 is disposed within the first inner injector body 628 and biases the pintle head 634 away from the first inner injector body 628, thereby biasing the pintle 632 toward a valve seat defining an outlet 658 in the orifice plate 636. A solenoid 660 may surround the pintle head 634 and may be operable to move the pintle head 634 and pintle 632 toward the first inner injector body 628 to separate the pintle 632 from the outlet 658 to allow fluid from the annular outer passageway 654 to flow through the outlet 658 in the orifice plate 636 and out of the injector 624 through the fifth port 648.

The second port 642 may be in fluid communication with a passage 670 extending through the outer injector body 626. The outer injector body 626 may include an annular collar 672 that surrounds a portion of the second inner injector body 630 and the fifth port 648. An annular recess 674 may be formed in one axial end of the collar 672 and may provide fluid communication between the passage 670 and the fourth port 646.

As described above, the injector 624 may be incorporated into the system 510 shown in FIG. 6 instead of the injector 524. That is, the first port 640 may be fluidly connected to the first conduit 528; the second port 642 may be fluidly connected to the second conduit 534 and the third conduit 538; and the third port 644 may be fluidly connected to the recirculation conduit 529.

Liquid reductant may enter the injector 624 through the first port 640 and may flow into the outer annular passageway 654 adjacent the first inner injector body 628. The liquid reductant may flow axially through the outer annular passageway 654 (i.e., in a direction parallel to a longitudinal axis of the outer annular passageway 654) toward the orifice plate 636. The control module 546 may be communication with the solenoid 660 and may actuate the solenoid 660 to move the pintle 632 out of sealing engagement with the orifice plate 636 to allow the liquid reductant in the outer annular passageway 654 to flow through the outlet 658 and the fifth port 648 and enter the stream of exhaust gas in the exhaust pipe 512.

When the pintle 632 is in sealing engagement with the orifice plate 636 (thereby preventing flow through the fifth port 648), the liquid reductant in the outer annular passageway 654 may flow through the one or more apertures 657 in the second inner injector body 630 and into the second inner passageway 652. Liquid reductant in the second inner passageway 652 may flow axially toward the pintle head 634 and flow through the one or more apertures 655 in the pintle head 634 into the first inner passageway 650. From the first inner passageway 650, the liquid reductant may flow out of the injector 624 through the third port 644 and into the recirculation conduit 529 to return to the liquid reductant tank 518. The flow of liquid reductant through the inner passageways 650, 652 may cool the solenoid 660 and/or other heat-sensitive components of the injector 624.

Ammonia gas (and optionally, air) may enter the injector 624 through the second port 642 and may flow into the passage 670. From the passage 670, the ammonia gas (and air) may flow into the annular recess 674 and through the fourth port 646 to enter the stream of exhaust gas in the exhaust pipe 512. In some configuration, the flow of ammonia gas and/or air through the second and fourth ports 642,

646 may cool the solenoid 660 and/or other heat-sensitive components of the injector 624.

In some configurations (e.g., a configuration shown in FIG. 8*a*), the injector 624 might not include the second port 642 and the fourth port 646. In such configurations, the system 510 might not include the recirculation conduit 529; the third port 644 may be fluidly connected to the second conduit 534 and the third conduit 538; and the first port 640 may be fluidly connected to the first conduit 528, as shown in FIG. 8*a*. As described above, liquid reductant from the first conduit 528 may flow through the first port 640, through the annular outer passageway 654 and through the fifth port 648 when the pintle 632 is moved out of sealing engagement with the orifice plate 636.

Ammonia gas (and optionally, air) may enter the injector 624 through the third port 644. From the third port 644, the ammonia gas (and air) may flow through the first inner passageway 650 and into the second inner passageway 652. From the second inner passageway 652, the ammonia gas (and air) may flow through the one or more apertures 657 in the second inner injector body 630 and flow through the fifth port 648 (and into the exhaust pipe 512) when the pintle 632 is moved out of sealing engagement with the orifice plate 636. The ammonia gas (and air) may mix with the liquid reductant in the annular outer passageway 654 before, during and/or after the liquid reductant and the gaseous ammonia flow through the outlet 658 and the fifth port 648.

In the above configuration of the injector 624 (FIG. 8*a*) that does not include the second port 642 and the fourth port 646, the injector 624 could also be incorporated into any of the systems 10, 110, 210, 310, 410 described above.

Figure 9:
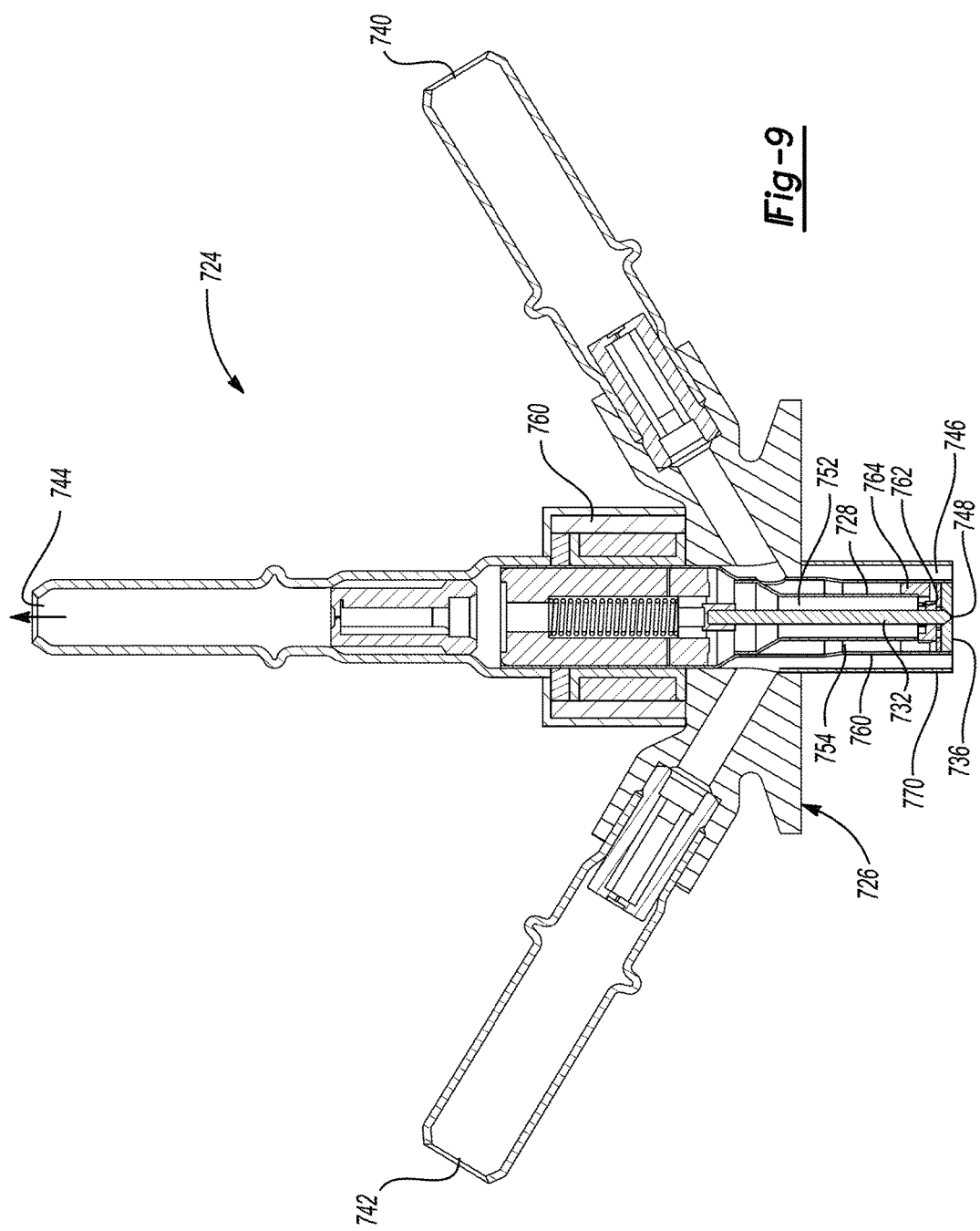
FIG. 9 is a cross-sectional view of another injector that can be incorporated into the exhaust aftertreatment system of FIG. 6.

Referring now to FIG. 9, another injector 724 is provided that may be incorporated into the system 510 instead of the injector 524. The structure and function of the injector 724 may be generally similar to that of the injector 624 described above, and therefore, similar features may not be described again in detail. The injector 724 may include an outer injector body 726 having a first port (e.g., a liquid reductant inlet) 740, a second port (i.e., a gaseous ammonia inlet) 742, a third port (e.g., a recirculation outlet) 744, a fourth port (e.g., a gaseous ammonia outlet) 746, and a fifth port (e.g., a liquid reductant outlet) 748. The fifth injector port 748 may be defined by an orifice plate 736.

A tubular inner body 728 may be axially aligned with the third port 744 and may define an inner passage 752 in fluid communication with the third port 744. A pintle 732 may extend through the inner passage 752 and may selectively sealingly engage a valve seat on the orifice plate 736 that defines the fifth port 748. A first annular collar 760 may extend from the outer injector body 726 and may surround at least a portion of the tubular inner body 728. The first annular collar 760 and the tubular inner body 728 may cooperate to define an annular intermediate passage 754 that is in fluid communication with the first port 740. The annular intermediate passage 754 is in fluid communication with the first port 740 and is in fluid communication with the fifth port 748 when the pintle 748 is in an open position (i.e., moved out of sealing engagement with the orifice plate 736 via solenoid 760). The annular intermediate passage 754 is also in fluid communication with the inner passage 752 via one or more apertures 762 in a lower guide member 764 attached to the tubular inner body 728 and the first annular collar 760. The tubular inner body 728 and the first annular collar 760 may form a cartridge assembly similar to the cartridge assembly disclosed in Assignee's commonly owned U.S. Pat. No. 8,978,364, the disclosure of which is incorporated by reference herein.

A second annular collar 770 may extend from the outer injector body 726 and may surround at least a portion of the first annular collar 760 and the tubular inner body 728. The second annular collar 770 and the first annular collar 760 may cooperate to define an annular shape of the fourth port 746 such that the fourth port 746 surrounds the fifth port 748 and is disposed radially outward relative to the fifth port 748. The fifth port 748 is in fluid communication with the second port 742. The annular shape of the second annular collar 770 and the positioning of the second annular collar 770 around the first annular collar 760 and the pintle 732 may allow the flow of ammonia gas and/or air through the second annular collar 770 to cool heat-sensitive components of the injector 724. While FIG. 9 shows the fourth port 746 being an open annular port, in some configurations, the fourth port 746 may have standoffs (i.e., support members) that partially support the second annular collar 770 relative to first annular collar 760 and partially blocks fluid flow therethrough.

Figure 10:
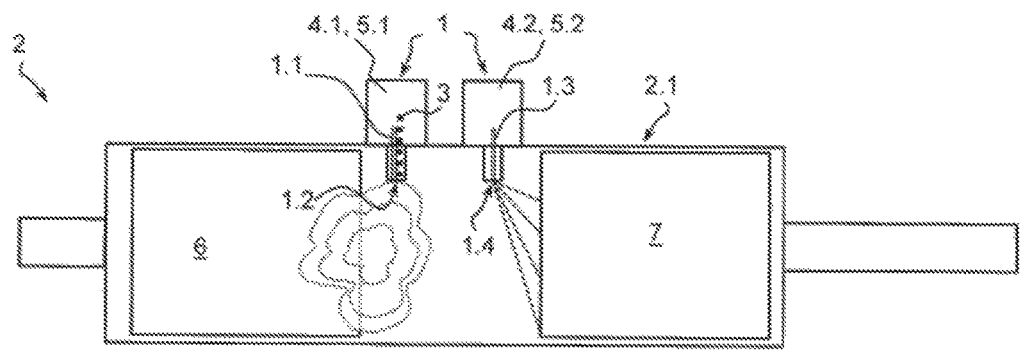
FIG. 10 is a schematic representation of yet another exhaust aftertreatment system including an injecting unit according to the principles of the present disclosure.
Figure 11:
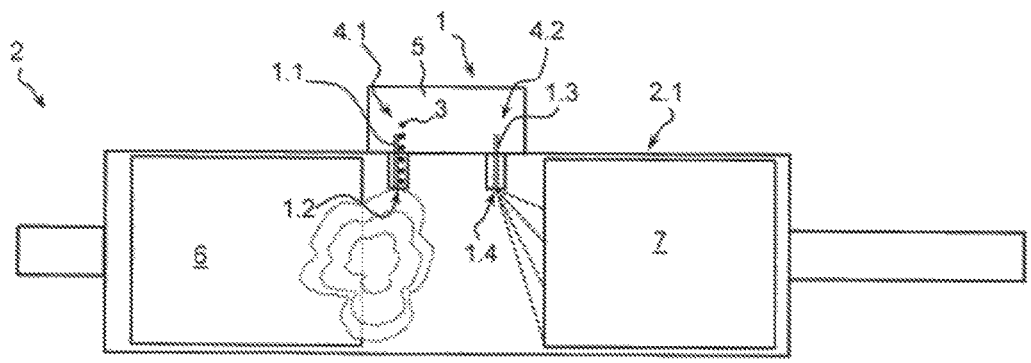
FIG. 11 is a schematic representation of yet another exhaust aftertreatment system with an alternate injecting unit.

With reference to FIGS. 10 and 11, another feeding device 1 and exhaust gas facility 2 is provided. The feeding device 1 can be structured and function similarly or identically to the feeding devices or injectors 24, 524, 624, 724 described above, apart from any exceptions described below. Therefore, similar features will not be described again in detail.

The feeding device 1 may feed an additive into a mixing unit 2.1 of an exhaust gas facility 2 upstream of an exhaust aftertreatment device 7 (e.g., an SCR catalyst, oxidation catalyst, particulate filter, etc.), wherein the feeding device 1 comprises at least one first feeding channel 1.1 with at least one first feeding opening 1.2 and a heating element 3 for evaporating at least a part of the additive that can be fed through the first feeding channel 1.1.

In an evaporated state, the additive is present in gaseous form. If the evaporation rate is lower than 100%, the remaining portion is present in liquid form, usually in the form of an unevaporated liquid film or as droplets. Here, the size of the droplets can vary very widely depending on the ambient conditions. It is also possible that a medium that was formerly in an evaporated state is condensed by cooling and is thus returned to the liquid state in the form of droplets.

The present disclosure also provides a method for introducing the additive into the exhaust gas facility 2 by using the feeding device 1 of this type.

The additive can be a substrate which is designed to be fed separately by itself. Alternatively, the additive can be a carrier solution which contains the desired substrate. With the exemplary embodiment described, a reduction agent such as ammonia can in particular be considered as a potential substrate. The present disclosure also provides a mixing unit 2.1 with the feeding device 1 and to the exhaust gas facility 2 with the mixing unit 2.1 of this type.

A dosing unit for an additive is already known from US 2008/0073558 A1. This comprises a capillary channel for conveying the liquid additive, which is surrounded by a thermal storage system. By means of the thermal storage system, the additive can be heated briefly, or also continuously heated until it reaches an evaporation temperature.

A similar dosing unit for additive such as an ammonia solution or a hydrocarbon is known from WO 2014/070516 A1. This comprises a circulation channel for the additive, so that it is used as a cooling agent for the dosing unit. Furthermore, one or more capillary channels are provided, in which the additive is evaporated in order to feed the additive into the exhaust gas flow. The thermal energy required for this purpose can as an option be generated by a heating element, in particular during the starting phase.

An object of the present disclosure is to design and arrange the feeding device 1 for feeding the additive and a method for introducing the additive in such a manner that an improved introduction rate and faster provision of the additive are achieved.

The objective can be attained according to an aspect of the present disclosure by the fact that at least one second feeding channel 1.3 with at least one second feeding opening 1.4 is provided, wherein the second feeding channel 1.3 is free of the heating element 3 for evaporation.

The objective can also be attained according to an aspect of the present disclosure by means of the fact that the additive is selectively fed through the first feeding channel 1.1 and the first feeding opening 1.2 and/or through the second feeding channel 1.3 and the second feeding opening 1.4, wherein during feeding via the first feeding channel 1.1, the additive is at least partially evaporated and is fed at least partially in evaporated form from the first feeding opening 1.2 to the exhaust gas facility 2, and the additive is fed via the second feeding channel 1.3 and the second feeding opening 1.4 in liquid form.

As a result, it is possible for additives, depending on the operating state of the internal combustion engine, to be optimally fed in different aggregate states via the feeding device 1 to the exhaust gas. The respective feeding openings 1.2, 1.4 or respective feeding channels 1.1, 1.3 can be designed in accordance with the aggregate state to be supplied so that optimum flow conditions can be achieved for liquid medium on the one hand and for at least partially gaseous medium on the other. Through the use of the second channel 1.3, the feed can be also conducted simultaneously in two different aggregates (i.e., in liquid form and in at least partially evaporated form).

While with low loads and during the cold start phase, a purely gaseous feed is advantageous. During operating point when the high dosage quantities are required, such as in the medium and full load range, a liquid feed can be conducted as a supplement. A temperature level of the exhaust gas which is accordingly higher is usually present in these operating states. When the exhaust gas temperatures are sufficiently high, a restriction to liquid feed only can be advantageous. Thus, risks of deposits, such as those which occur with a purely liquid feed at low exhaust gas temperatures, can be reduced. At the same time, energy savings can be achieved, since not all fed additives need to be evaporated.

The additive to be introduced in liquid form can however be pre-heated within the feeding device 1 or within the second feeding channel 1.3, so that following its exit from the feeding channel 1.3, more rapid evaporation in the exhaust gas is ensured. Only evaporation within the second feeding channel 1.3 is not provided.

For this purpose, it can also be advantageous if a first feeding unit 4.1 and a second feeding unit 4.2 are provided, wherein the at least one first feeding channel 1.1 is arranged in the first feeding unit 4.1, and the at least one second feeding channel 1.3 is arranged in the second feeding unit 4.2. With the application of two different feeding units, the respective feeding channel is separated in relation to the provision with additive on the one hand and with heat on the other. This can have a positive effect, in particular with regard to the different heat quantities to be transmitted.

Further it can be advantageous if the first feeding unit 4.1 and the second feeding unit 4.2 are integrated in a housing 5 (FIG. 11), or the first feeding unit 4.1 and the second feeding unit 4.2 are in each case integrated in separate housings 5.1, 5.2, respectively (FIG. 10). Both variants have their advantages. With a structural separation into the two housings 5.1, 5.2, independent positioning on or in the exhaust gas facility 2 is possible. Thus, on the one hand, the desired feeding points can be taken into account, as well as the structural conditions outside the exhaust gas facility 2 on the other. The use of one housing 5 results in simpler manufacturing and mounting.

Here, it can advantageously be provided that the additive is at least partially evaporated upstream of the first feeding channel 1.1 and/or within the first feeding channel 1.1. When evaporation is conducted as late as possible (i.e., shortly before the feeding opening), the further supply path to be heated through to the feeding opening 1.2 is correspondingly short. This reduced the heating capacity required. It can be of particular significance if at least a portion of 50% to 80% or 70% of the mass of the additive guided through the first feeding channel 1.1 or fed to the first feeding opening 1.2 is evaporated. With the evaporation rate named above, an optimal ratio results between the introduction rate on the one hand and the necessary heat input on the other. A higher evaporation rate can be advantageous. However, for this purpose, a higher heat input is required. In the light of the deposits of residual additive, which should be avoided, lower evaporation rates should be avoided, particularly with cooler internal combustion engines.

In connection with the design and arrangement according to an aspect of the present disclosure, it can be advantageous if between 60 g/h and 600 g/h of the additive is fed to the exhaust gas through the first feeding channel 1.1. The mass flow of the at least partially evaporated additive automatically leads to a corresponding heat input, at least when the evaporation rate remains constant. However, when the evaporation rate is reduced, a higher mass flow can be fed with the same heat input.

It can furthermore be advantageous when a reduction agent is used as the additive, such as a urea-water solution or a water-ammonia solution.

In this application, including the definitions below, the term "module" or "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust aftertreatment system comprising:
   a reductant tank;
   a gaseous ammonia source;
   an injector receiving liquid reductant from the reductant tank and gaseous ammonia from the gaseous ammonia source and injecting the liquid reductant into a stream of exhaust gas in a first mode, and injecting the gaseous ammonia into the stream of exhaust gas in a second mode;
   a first conduit communicating liquid reductant from the reductant tank to the injector; and
   a second conduit communicating gaseous ammonia from the gaseous ammonia source to the injector.

2. The exhaust aftertreatment system of claim 1, wherein the injector simultaneously injects both of the liquid reductant and the gaseous ammonia into the stream of exhaust gas in a third mode.

3. The exhaust aftertreatment system of claim 2, wherein the injector includes an outlet port through which a mixture of liquid reductant and gaseous ammonia are injected into the stream of exhaust gas.

4. The exhaust aftertreatment system of claim 3, wherein the injector includes a pair of inlet ports fluidly connecting the first and second conduits with the outlet port.

5. The exhaust aftertreatment system of claim 1, wherein the injector is fluidly coupled with an exhaust pipe at a location upstream of a catalyst in the stream of exhaust gas.

6. The exhaust aftertreatment system of claim 5, wherein the injector includes a liquid reductant input to receive the liquid reductant and a gaseous ammonia input to receive the gaseous ammonia.

7. The exhaust aftertreatment system of claim 6, wherein the catalyst is a selective catalytic reduction catalyst.

8. The exhaust aftertreatment system of claim 1, further comprising an air source to facilitate injection of both the liquid reductant and the gaseous ammonia into the stream of exhaust gas.

9. The exhaust aftertreatment system of claim 8, wherein the air source is in fluid communication with the injector via a third conduit, and wherein air flow through a passage in the injector cools the injector.

10. The exhaust aftertreatment system of claim 9, further comprising a first valve disposed along the third conduit and controlling the fluid flow therethrough.

11. The exhaust aftertreatment system of claim 10, wherein the injector includes a liquid-reductant outlet that is fluidly connected to a recirculation conduit coupled to a liquid reductant tank.

12. The exhaust aftertreatment system of claim 11, wherein the liquid reductant from the reductant tank and the gaseous ammonia from the gaseous ammonia source is mixed in a chamber within the injector.

13. The exhaust aftertreatment system of claim 12, further comprising an electrical heating element in a heat transfer relationship with the air tank.

14. The exhaust aftertreatment system of claim 13, wherein the first conduit includes a second valve to prevent backwards flow of the liquid reductant.

15. The exhaust aftertreatment system of claim 14, further comprising a control module controlling a position of the first valve and a rate of injection of a mixture of the liquid reductant and the gaseous ammonia.

16. An exhaust aftertreatment system comprising:
a reductant tank containing liquid reductant;
a gaseous ammonia source containing gaseous ammonia;
a pressurized air source facilitating injection of one or both of the liquid reductant and the gaseous ammonia into a stream of exhaust gas;
a first conduit communicating liquid reductant from the reductant tank to the stream of exhaust gas;
a second conduit communicating gaseous ammonia from the gaseous ammonia source to the stream of exhaust gas; and
a third conduit communicating pressurized air from the pressurized air source to the stream of exhaust gas.

17. The exhaust aftertreatment system of claim 16, further comprising an injector that receives the gaseous ammonia from the second conduit and the pressurized air from the third conduit, wherein the second and third conduits are in communication with each other upstream of the injector.

18. The exhaust aftertreatment system of claim 16, further comprising an electrical heating element in a heat transfer relationship with the pressurized air source.

19. The exhaust aftertreatment system of claim 16, further comprising an injector in fluid communication with the first, second and third conduits, and wherein the injector includes a liquid-reductant outlet that is fluidly connected to a recirculation conduit coupled to the liquid reductant tank.

20. The exhaust aftertreatment system of claim 16, wherein a first valve is disposed along the first conduit to prevent backward flow of the liquid reductant.

21. The exhaust aftertreatment system of claim 20, wherein a second valve is disposed along the third conduit to control the fluid flow therethrough.

22. The exhaust aftertreatment system of claim 16, further comprising an injector receiving the liquid reductant from the reductant tank via the first conduit and the gaseous ammonia from the gaseous ammonia source via the second conduit and injecting both the reductant and the gaseous ammonia into the stream of exhaust gas.

23. The exhaust aftertreatment system of claim 22, wherein the liquid reductant from the reductant tank and the gaseous ammonia from the gaseous ammonia source mixes in a chamber within the injector.

24. An injector for an exhaust aftertreatment system, the injector comprising an injector body including a first port, a second port, a third port, a fourth port, and a fifth port, the first port in fluid communication with the third port and the fifth port, the second port in fluid communication with the fourth port, the second and fourth ports are fluidly isolated from the first, third and fifth ports, the injector body housing a pintle that is movable between a closed position preventing fluid flow through the fifth port and an open position allowing fluid flow through the fifth port.

25. The injector of claim 24, wherein the first port is fluidly connected to a liquid reductant conduit, and the second port is fluidly connected to a conduit containing ammonia gas.

26. The injector of claim 25, wherein the third port forms a liquid-reductant outlet that is fluidly connected to a recirculation conduit coupled to a liquid reductant tank.

27. The injector of claim 25, wherein the fourth port is defined by an outer annular collar surrounding the fifth port.

28. The injector of claim 27, further comprising an intermediate annular collar extending from the injector body, the intermediate annular collar is surrounded by the outer annular collar and cooperates with the outer annular collar to define the fourth port.

29. The injector of claim 28, further comprising a tubular inner body that is surrounded by the intermediate annular collar, the tubular inner body cooperating with the intermediate annular collar to define an annular passageway in fluid communication with the first port, and wherein the tubular inner body defines an inner passageway in fluid communication with the third port.

30. The injector of claim 29, wherein the pintle is disposed within the inner passageway.

31. An injector for an exhaust aftertreatment system, the injector comprising:
an outer body including a liquid inlet port receiving liquid reductant, a gas inlet port receiving gaseous ammonia, a liquid outlet port through which the liquid reductant exits the injector, and a gas outlet port through which the gaseous ammonia exits the injector; and
a pintle disposed within the outer body and movable between an open position allowing fluid flow through the liquid outlet port and a closed position preventing fluid flow through the liquid outlet port.

32. The injector of claim 31, wherein the gas outlet port is formed in an annular collar that at least partially surrounds the liquid outlet port.

33. The injector of claim 32, wherein the gas outlet port is an annular port that at least partially surrounds the liquid outlet port.

34. The injector of claim 32, wherein the annular collar includes an annular recess that surrounds a portion of the pintle and is in fluid communication with the gas inlet port and the gas outlet port, and wherein the annular recess is axially spaced apart from the liquid outlet port.

35. The injector of claim 31, wherein the outer body includes a liquid-recirculation outlet port.

36. The injector of claim 35, wherein the liquid-recirculation port is in fluid communication with inner passage disposed within the outer body, wherein the pintle is at least partially disposed within the inner passage, wherein the outer body includes a first annular collar that defines a first annular passage surrounding a portion of the inner passage, wherein the first annular passage fluidly connects the liquid inlet port with the liquid outlet port, wherein the outer body includes a second annular collar that cooperates with the first annular collar to define the gas outlet port, and wherein the gas outlet port is a second annular passage that surrounds at least a portion of the first annular passage.

37. An exhaust aftertreatment system comprising:
a reductant tank;
a reactor system receiving reductant from the reductant tank and outputting gas comprising ammonia;
a storage tank receiving gas comprising ammonia from the reactor system and storing a volume of gas comprising ammonia;
a first conduit communicating gas comprising ammonia from the reactor system to a stream of exhaust gas, the first conduit bypassing the storage tank; a second conduit communicating gas comprising ammonia from the storage tank to the stream of exhaust gas;
a third conduit communicating gas comprising ammonia from the reactor system to the storage tank; and
a first heat exchanger in a heat transfer relationship with the reactor system, the first heat exchanger transferring heat from exhaust gas to the reactor system, further comprising a second heat exchanger in which heat is transferred from the stream of exhaust gas to a working fluid, wherein the first and second heat exchangers are fluidly coupled to each other to allow a first flow of the working fluid therebetween.

* * * * *